(12) United States Patent
Suzuki

(10) Patent No.: US 12,249,938 B2
(45) Date of Patent: Mar. 11, 2025

(54) ROTATING MACHINE CONTROL DEVICE

(71) Applicant: DENSO CORPORATION, Kariya (JP)

(72) Inventor: Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 210 days.

(21) Appl. No.: 18/049,440

(22) Filed: Oct. 25, 2022

(65) Prior Publication Data

US 2023/0064290 A1 Mar. 2, 2023

Related U.S. Application Data

(63) Continuation of application No. PCT/JP2021/015676, filed on Apr. 16, 2021.

(30) Foreign Application Priority Data

Apr. 28, 2020 (JP) .................. 2020-079361

(51) Int. Cl.
| | | |
|---|---|---|
| *H02P 27/04* | (2016.01) | |
| *H02K 11/20* | (2016.01) | |
| *H02K 11/33* | (2016.01) | |
| *H02M 1/084* | (2006.01) | |
| *H02M 7/537* | (2006.01) | |
| *H02P 5/46* | (2006.01) | |
| *H02P 27/06* | (2006.01) | |
| *H02P 29/024* | (2016.01) | |

(52) U.S. Cl.
CPC .............. *H02P 27/06* (2013.01); *H02K 11/20* (2016.01); *H02K 11/33* (2016.01); *H02M 1/084* (2013.01); *H02M 7/537* (2013.01); *H02P 5/46* (2013.01); *H02P 29/024* (2013.01)

(58) Field of Classification Search
CPC .......... H02P 27/06; H02P 5/46; H02P 29/024; H02M 1/084; H02M 7/537
See application file for complete search history.

(56) References Cited

U.S. PATENT DOCUMENTS

| | | |
|---|---|---|
| 6,959,969 B2 | 11/2005 | Simpson et al. |
| 2003/0155875 A1 | 8/2003 | Weinmann |

FOREIGN PATENT DOCUMENTS

| | | | | |
|---|---|---|---|---|
| CN | 109874382 B | * | 3/2021 | ............... B62D 5/04 |
| JP | 5125055 B2 | | 1/2013 | |
| JP | 5614576 B2 | | 10/2014 | |
| JP | 5614588 B2 | | 10/2014 | |
| JP | 2014-218129 B2 | | 11/2014 | |
| JP | 5768998 B2 | | 8/2015 | |
| JP | 5768999 B2 | | 8/2015 | |

* cited by examiner

*Primary Examiner* — Karen Masih
(74) *Attorney, Agent, or Firm* — Maschoff Brennan

(57) ABSTRACT

A rotating machine control device drives a multi-phase rotating machine and a direct-current rotating machine. The control unit controls an operation of an inverter switching element and a direct current rotating machine switch in a drive circuit of the multi-phase rotating machine and the direct current rotating machine. The control unit has an anomaly detection unit for detecting an anomaly in the multi-phase power converter or the multi-phase rotating machine, or an anomaly in a direct current rotating machine switch or the direct current rotating machine. The control unit changes the switching operation of the inverter switching element and the direct current rotating machine switch according to the anomaly.

16 Claims, 32 Drawing Sheets

TILT ACTUATOR

TELESCOPIC ACTUATOR

CONNECTION CONFIGURATION EXAMPLE 1 OF CONNECTOR

CONFIGURATION EXAMPLE 1 OF LATCH CIRCUIT

FIG. 10 CONFIGURATION EXAMPLE 2 OF LATCH CIRCUIT

CONFIGURATION EXAMPLE 1

CONFIGURATION EXAMPLE 2

ARRANGEMENT EXAMPLE OF PULL-UP RESISTOR (TWO DC MOTORS WITH IN-PHASE)

ARRANGEMENT EXAMPLE OF PULL-UP RESISTOR (TWO DC MOTORS WITH IN-PHASE)

ARRANGEMENT EXAMPLE OF PULL-UP RESISTOR (TWO DC MOTORS WITH OUT-OF-PHASE)

ARRANGEMENT EXAMPLE OF PULL-UP RESISTOR (TWO DC MOTORS WITH OUT-OF-PHASE)

ARRANGEMENT EXAMPLE OF PULL-UP RESISTOR (ONE DC MOTOR)

ARRANGEMENT EXAMPLE OF PULL-UP RESISTOR (ONE DC MOTOR)

FIG. 20

| [ACTION A] | [ACTION B] |
|---|---|
| TURN OFF POWER SOURCE RELAY<br>TURN OFF BLM DRIVE CIRCUIT<br>TURN OFF DCM DRIVE CIRCUIT | TURN OFF<br>DCM DRIVE CIRCUIT |

CASE WHERE NORMAL CONDITION IS NOT SATISFIED MULTIPLE TIMES ↓

| STEP | CHECK ITEM | NORMAL CONDITION<br>(*PDC= PRE DRIVER CHECK) | ANOMALY ACTION |
|---|---|---|---|
| S021 | GROUND FAULT | Vpig < THRESHOLD | A |
| S022 | OPEN CIRCUIT OF PRE CHARGE CIRCUIT | PRE CHARGE RESULT = NORMAL | A |
| S031 | SHORT CIRCUIT OF POWER SOURCE RELAY / REVERSE CONNECTION PROTECTION RELAY | Vint > THRESHOLD | A |
| S032 | SHUT DOWN FUNCTION OF POWER SOURCE RELAY | TURN ON SHUT DOWN REQUEST, TURN ON PORT OUTPUT, AND Vint < THRESHOLD | A |
| S033 | SHUT DOWN FUNCTION OF BLM DRIVE CIRCUIT | TURN ON SHUT DOWN REQUEST, TURN ON PORT OUTPUT, AND PDC = LO | A |
| S034 | (BLM RELAY) | TURN ON SHUT DOWN REQUEST, TURN ON PORT OUTPUT, AND PDC = LO | A |
| S035 | SHUT DOWN FUNCTION OF DCM DRIVE CIRCUIT | TURN ON SHUT DOWN REQUEST, TURN ON PORT OUTPUT, AND PDC = LO | B |
| S036 | (SHUT DOWN FUNCTION OF DCM RELAY) | TURN ON SHUT DOWN REQUEST, TURN ON PORT OUTPUT, AND PDC = LO | B |
| S037 | OVER CURRENT MONITORING FUNCTION | OVER CURRENT MONITORING RESULT = HI | A |
| S041 | OPEN CIRCUIT OF REVERSE CONNECTION PROTECTION RELAY | TURN ON PORT OUTPUT AND Vint > THRESHOLD | A |
| S042 | PIG DISCONNECTION / OPEN CIRCUIT OF POWER SOURCE RELAY | TURN ON PORT OUTPUT AND Vint > THRESHOLD | A |
| S051 | TURN ON PRE DRIVER | TURN ON PORT OUTPUT AND PDC = HI | A |
| S052 | ANOMALY OF HI/LO IN CURRENT SENSOR | ABSOLUTE VALUE OF CURRENT DETECTION VALUE < THRESHOLD | A |
| S053 | SHUT DOWN FUNCTION OF BLM ENB | TURN OFF ENB, TUR ON PORT OUTPUT AND PDC = LO | A |
| S054 | (SHORT CIRCUIT OF BLM RELAY) | TERMINAL VOLTAGE WITHIN PREDETERMINED RANGE | A |
| S061 | ANOMALY OF DCM DRIVE CIRCUIT | TERMINAL VOLTAGE WITHIN PREDETERMINED RANGE | SHORT CIRCUIT TYPE A<br>OPEN CIRCUIT TYPE B |
| S062 | SHUT DOWN FUNCTION OF DCM ENB | TURN ON PORT OUTPUT AND PDC = HI | B |

CONTROL EXAMPLE 1

FIG. 31

| ANOMALY TYPE | CHECK ANOMALY OF MICROCOMPUTER AND INPUT CIRCUIT | | CHECK ANOMALY OF BLM CIRCUIT | | CHECK ANOMALY OF DCM CIRCUIT | |
|---|---|---|---|---|---|---|
| | SHORT CIRCUIT TYPE | OPEN CIRCUIT TYPE | SHORT CIRCUIT TYPE | OPEN CIRCUIT TYPE | SHORT CIRCUIT TYPE | OPEN CIRCUIT TYPE |
| ACTION — HOW TO STOP | TURN OFF POWER SOURCE RELAY | TURN OFF AFTER REDUCING CURRENT GRADUALLY BY INVERTER, OR TURN OFF IMMEDIATELY | TURN OFF POWER SOURCE RELAY | TURN OFF AFTER REDUCING CURRENT GRADUALLY BY INVERTER, OR TURN OFF IMMEDIATELY | TURN OFF POWER SOURCE RELAY | TURN OFF AFTER REDUCING CURRENT GRADUALLY BY INVERTER, OR TURN OFF IMMEDIATELY |
| ACTION — HOW TO CONTINUE | STOP BOTH (SHIFT ONE SYSTEM DRIVE IN CASE OF ANOMALY AT THE OTHER SYSTEM IN TWO SYSTEMS) | | | | CONTINUE ONLY BLM CIRCUIT | |

ROTATING MACHINE CONTROL DEVICE

CROSS REFERENCE TO RELATED APPLICATION

The present application is a continuation application of International Patent Application No. PCT/JP2021/015676 filed on Apr. 16, 2021, which designated the U.S. and claims the benefit of priority from Japanese Patent Application No. 2020-079361 filed on Apr. 28, 2020. The entire disclosures of all of the above applications are incorporated herein by reference.

TECHNICAL FIELD

The present disclosure relates to a rotating machine control device.

BACKGROUND

Conventionally, a rotating machine control device that shares a circuit for driving a multi-phase rotating machine and a DC rotating machine is known. For example, the motor control device according to a conceivable technique drives a three-phase AC motor and two DC motors by one three-phase inverter drive circuit. Specifically, this motor control device is used as a vehicle steering device and drives an electric power steering (EPS) three-phase motor, a tilt DC motor, and a telescopic DC motor. By sharing the power converters of the three-phase motor and the DC motors, the power converter is downsized.

SUMMARY

According to an example, a rotating machine control device drives a multi-phase rotating machine and a direct-current rotating machine. The control unit controls an operation of an inverter switching element and a direct current rotating machine switch in a drive circuit of the multi-phase rotating machine and the direct current rotating machine. The control unit has an anomaly detection unit for detecting an anomaly in the multi-phase power converter or the multi-phase rotating machine, or an anomaly in a direct current rotating machine switch or the direct current rotating machine. The control unit changes the switching operation of the inverter switching element and the direct current rotating machine switch according to the anomaly.

BRIEF DESCRIPTION OF THE DRAWINGS

The above and other objects, features and advantages of the present disclosure will become more apparent from the following detailed description made with reference to the accompanying drawings. In the drawings:

FIG. 20 is a diagram showing a table of a normal condition and an anomaly action for each check item;

FIG. 31 is a diagram showing a table of switching of an action according to an anomaly.

DETAILED DESCRIPTION

Figure 1:
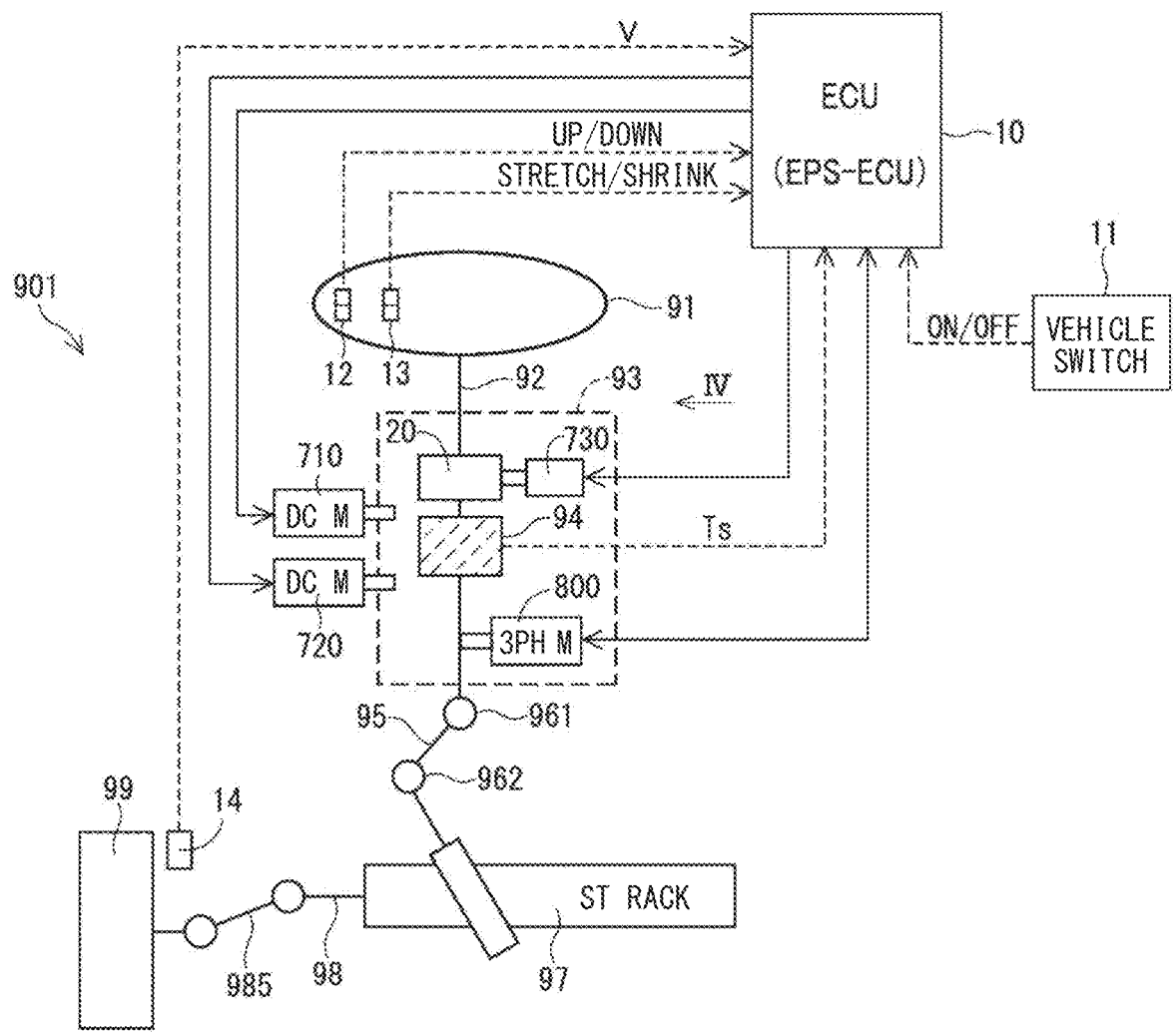
FIG. 1 is a diagram of a column type EPS system to which an ECU (i.e., a rotating machine control unit) of each embodiment is applied.

In a device that shares a circuit for driving a multi-phase rotating machine and a DC rotating machine, there may be a difficulty that if a failure occurs at any part of the device, a plurality of rotating machines cannot be driven together.

According to an example embodiments, a rotating machine control device switches an action according to an anomaly when an anomaly occurs in a circuit for driving a multi-phase rotating machine and a DC rotating machine.

The rotating machine control device of the present embodiments can drive one or more multi-phase rotating machines including one or more sets of multi-phase windings, and one or more direct current rotating machines having a first terminal as one end thereof connected to one or more phases of phase current paths in at least one set of multi-phase windings. This rotating machine control device includes one or more multi-phase power converters, a switch for a DC rotating machine, and a control unit.

The multiphase power converter is connected to a positive electrode and a negative electrode of a power supply via a high potential line and a low potential line, respectively. The multiphase power converter converts DC power of the power supply into multiphase AC power by operations of a plurality of inverter switching elements connected in a bridge configuration and applies a voltage to each phase winding of the multiphase winding set.

The DC rotating machine switch is made up of switches on a high potential side and a low potential side connected in series via a DC motor terminal. The DC motor terminal is connected to a second terminal that is an end of the DC rotating machine on the opposite side to the first terminal. The DC rotating machine switch makes the voltage of the DC motor terminal variable by switching.

The control unit operates the functions of the inverter switching element and the switch for the DC rotating machine in the "drive circuit of the multi-phase rotating machine and the DC rotating machine" including the multi-phase power converter and the switch for the DC rotating machine.

The control unit has an anomaly detection unit that detects an anomaly in the multi-phase power converter or the multi-phase rotating machine, or an anomaly in the switch for the DC rotating machine or the DC rotating machine.

The control unit changes the switching operation of the inverter switching element and the switch for the DC rotating machine according to the anomaly detected by the anomaly detection unit.

The control unit of the present embodiments switches the action by changing the switching operation according to the anomaly detected by the anomaly detection unit. For example, the control unit can secure at least a part of the functions by continuing to drive the multi-phase rotating machine or the DC rotating machine on the side where the anomaly is not detected.

Hereinafter, a plurality of embodiments of the rotating machine control device will be described with reference to the drawings. The rotating machine control device of each embodiment is applied to an electric power steering system (hereinafter, "EPS system") or a steer-by-wire system (hereinafter, "SBW system") of a vehicle, and functions as an EPS-ECU or an SBW-ECU. In the following embodiments, EPS-ECU or SBW-ECU are collectively referred to as "ECU".

[System Configuration]

Figure 2:
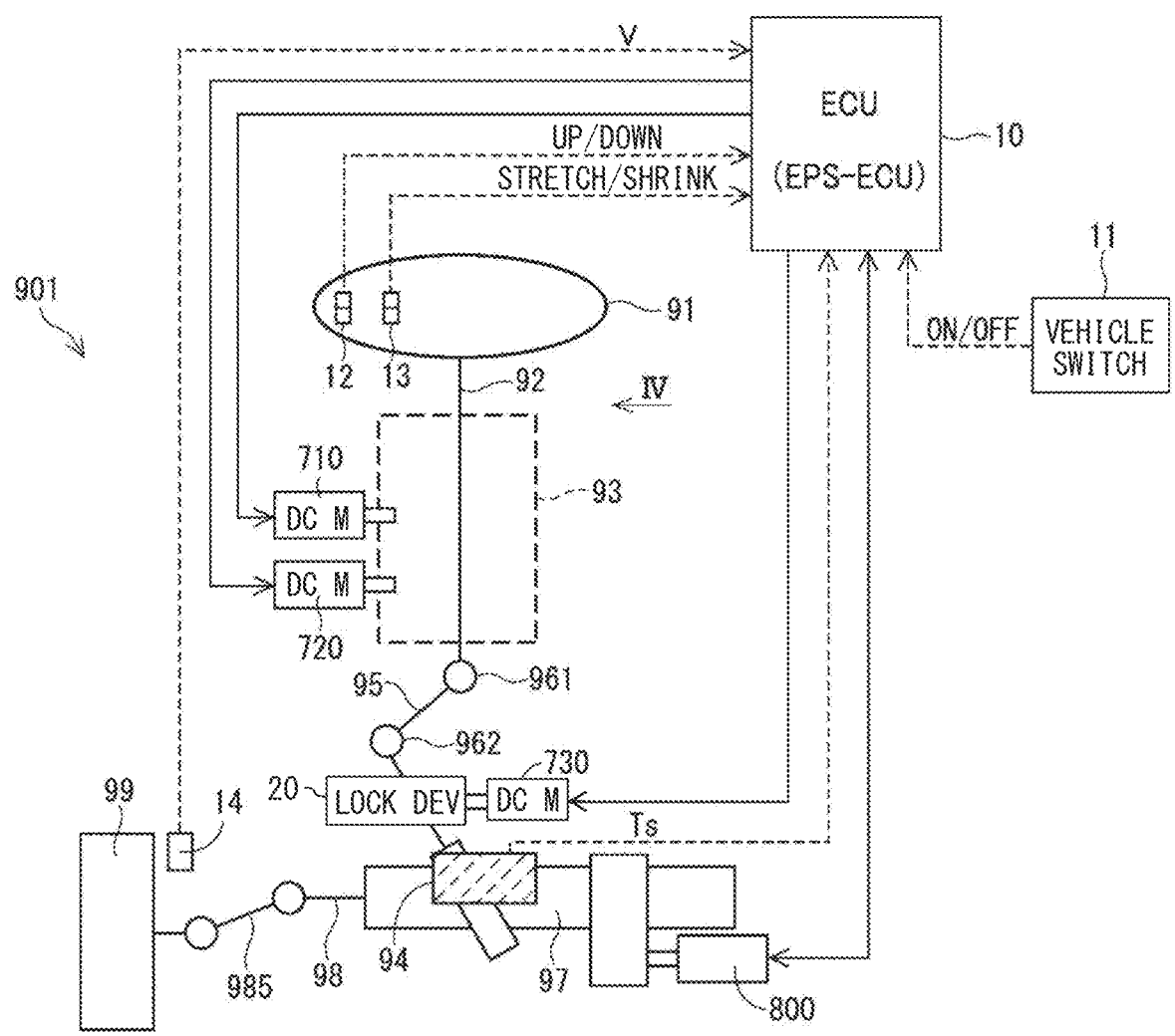
FIG. 2 is a diagram of a rack type EPS system to which an ECU (i.e., a rotating machine control unit) of each embodiment is applied.
Figure 3:
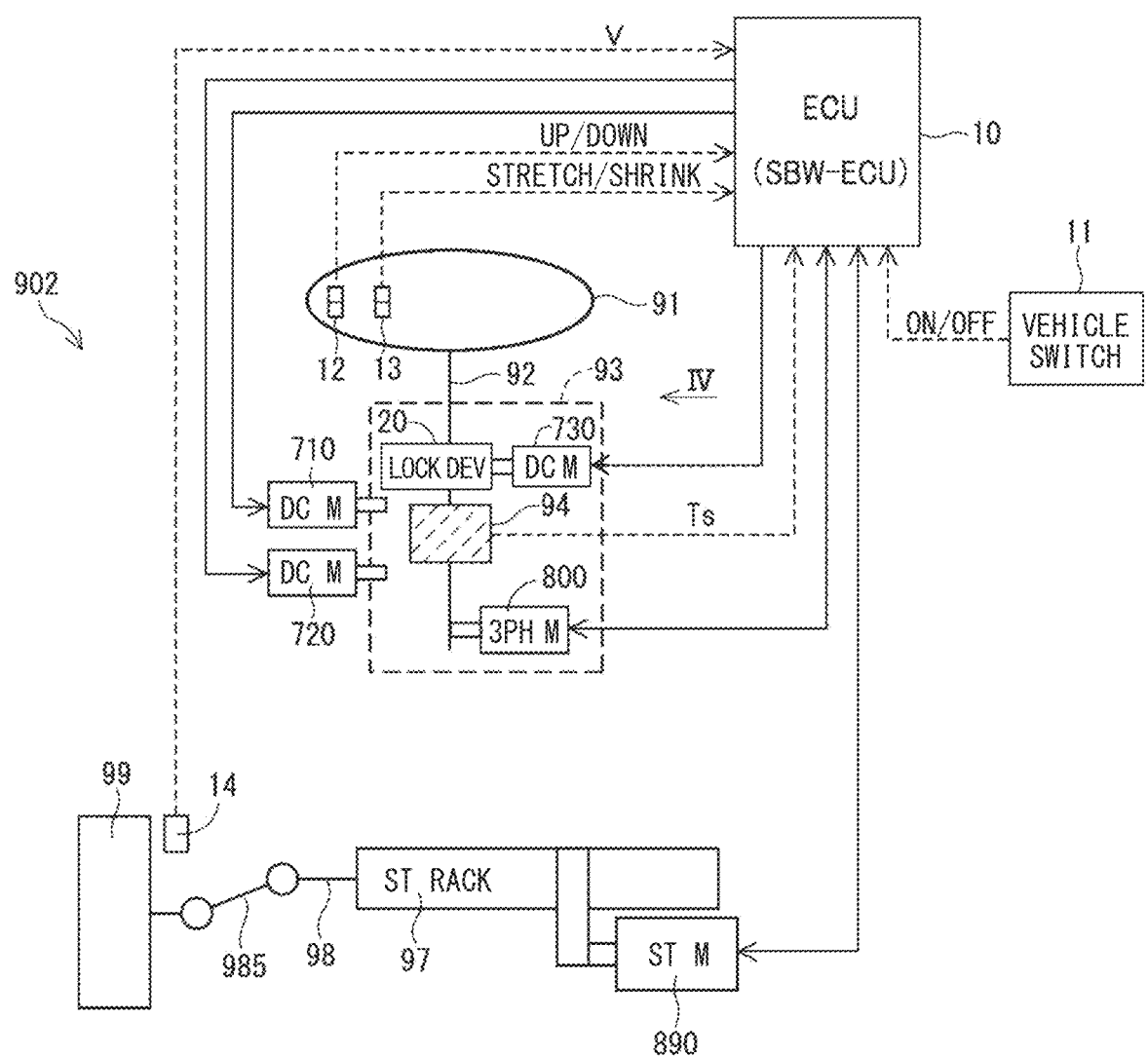
FIG. 3 is a diagram of an SBW system to which an ECU (i.e., a rotating machine control unit) of each embodiment is applied.

First, with reference to FIGS. 1 to 4B, a system configuration to which the ECU as the "rotating machine control device" is applied will be described. FIGS. 1 and 2 show an EPS system 901 in which a steering mechanism and a turning mechanism are mechanically connected. Of these, FIG. 1 shows a column type EPS system 901, and FIG. 2 shows a rack type EPS system 901. FIG. 3 illustrates an SBW system 902 in which the steering mechanism and the turning mechanism are separated mechanically. In FIGS. 1 to 3, only one side of a tire 99 is illustrated, and the illustration of the tire on the opposite side is not shown.

As illustrated in FIGS. 1 and 2, the EPS system 901 includes a steering wheel 91, a steering shaft 92, an intermediate shaft 95, a rack 97, and the like. The steering shaft 92 is accommodated in a steering column 93 and has one end connected to the steering wheel 91 and the other end connected to the intermediate shaft 95.

The rack 97, which converts a rotation motion into a reciprocating motion with a rack and pinion mechanism and transmits the reciprocating motion, is provided at the end of the intermediate shaft 95 on the side opposite to the steering wheel 91. When the rack 97 reciprocates, the tire 99 is turned via a tie rod 98 and the knuckle arm 985. Universal joints 961, 962 are provided in the middle of the intermediate shaft 95. Thereby, a displacement due to the tilt operation or the telescopic operation of the steering column 93 is absorbed.

In the column type EPS system 901 shown in FIG. 1, a three-phase motor 800 that functions as a steering assist motor is provided in the steering column 93, and the output torque of the three-phase motor 800 is transmitted to the steering shaft 92. A torque sensor 94 is provided in the middle of the steering shaft 92 and detects a steering torque Ts of a driver on the basis of the torsional displacement of a torsion bar.

In the rack type EPS system 901 shown in FIG. 2, a three-phase motor 800 that functions as a steering assist motor is attached to the steering rack 97. The reciprocating motion of the steering rack 97 is assisted by the output torque of the three-phase motor 800. The torque sensor 94 detects the steering torque Ts of the driver transmitted to the steering rack 97.

In the EPS system 901, an ECU 10 controls the drive of a three-phase motor 800 on the basis of the steering torque Ts detected by the torque sensor 94 and a vehicle speed V detected by a vehicle speed sensor 14, and outputs a desired steering assist torque. As thus described, in the EPS system 901, the rotating machine for steering assist torque output is used as a "multiphase rotating machine". Each signal to the ECU 10 is communicated by using CAN, serial communication, or the like, or is transmitted as an analog voltage signal.

The EPS system 901 is provided with one or more DC motors as "DC rotating machines". In the description of the detailed configuration described later, mainly, an example in which two DC motors of the tilt actuator 710 and a telescopic actuator 720 are provided and an example in which the steering lock actuator 730 is provided as one DC motor are separately described. Here, as a system configuration, for convenience, it is assumed that three DC motors 710, 720, and 730 are provided to explain at one time. For example, any one to three DC motors out of the three DC motors 710, 720, and 730 may be driven by a composite drive circuit with the three-phase motor 800 shown in FIGS. 7, 11 and the like. The remaining DC motors that are not driven by the composite drive circuit may be driven by a single drive circuit that is independent of the three-phase motor 800.

The tilt actuator 710 and the telescopic actuator 720 are provided on the steering column 93. It is called a steering position system actuator that changes the steering position by combining the tilt actuator 710 and the telescopic actuator 720.

Figure 4A:
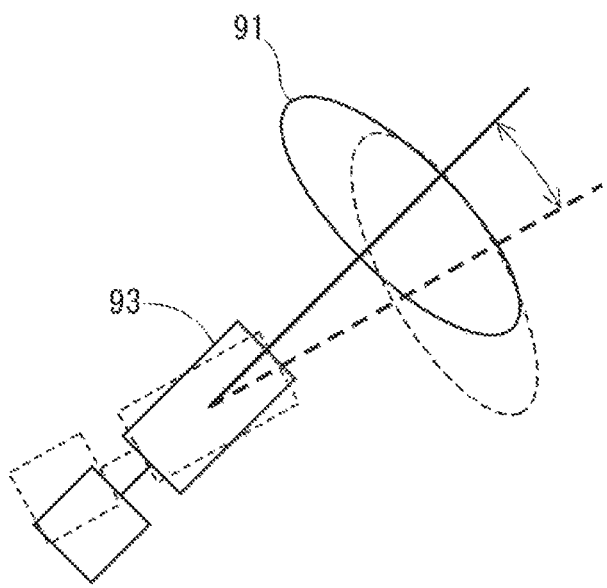
FIG. 4A is a schematic diagram illustrating a tilt operation.

When the driver operates a tilt switch 12 to input an instruction of "up/down" to the ECU 10, the ECU 10 instructs the tilt actuator 710 to perform a tilt operation. Then, as illustrated in FIG. 4A, the tilt actuator 710 adjusts a tilt angle to move the steering wheel 91 up and down. When the vehicle switch 11 is turned on to activate the vehicle, the steering wheel 91 moves to a driving position stored in advance, and when the vehicle switch 11 is turned off to stop the vehicle, the steering wheel 91 moves to a side where the space for the driver becomes larger.

Figure 4B:
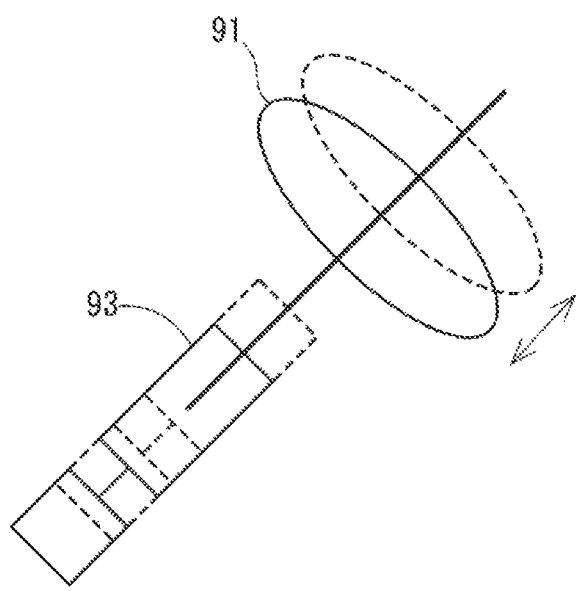
FIG. 4B is a schematic view for explaining a telescopic operation.

As shown in FIG. 4B, when the driver operates a telescopic switch 13 to input an instruction of "stretch/shrink" to the ECU 10, the ECU 10 instructs the telescopic actuator 720 to perform a telescopic operation. Then, as illustrated in FIG. B, the telescopic actuator 720 adjusts a telescopic length and moves the steering wheel 91 back and forth. When the vehicle switch 11 is turned on to activate the vehicle, the steering wheel 91 moves to a driving position stored in advance, and when the vehicle switch 11 is turned off to stop the vehicle, the steering wheel 91 moves to a side where the space for the driver becomes larger.

The steering lock actuator 730 drives the lock device 20 to mechanically restrict the rotation of the steering shaft 92, thereby locking the steering wheel 91 so that it does not rotate when parking or the like. The ECU 10 instructs the steering lock actuator 730 to release or re-lock the steering lock based on the on/off signal of the vehicle switch 11. The vehicle switch 11 corresponds to an ignition switch or a push switch of an engine vehicle, a hybrid vehicle, or an electric vehicle.

Subsequently, as illustrated in FIG. 3, in the SBW system 902 in which the steering mechanism and the turning mechanism are mechanically separated, the intermediate shaft 95 does not exist as compared to the EPS system 901. The steering torque Ts of the driver is electrically transmitted to the steering motor 890 via the ECU 10. The rotation of the steering motor 890 is converted into the reciprocating motion of the steering rack 97, and the tire 99 is turned via the tie rod 98 and the knuckle arm 985. Although not illustrated in FIG. 3, there is a turning motor ECU that drives the steering motor 890 in response to the steering wheel input of the driver.

In the SBW system 902, the driver cannot directly sense the reaction force to the steering. Therefore, the ECU 10 controls the drive of the three-phase motor 800, rotates the steering wheel 91 so as to apply a reaction force to steering, and gives the driver an appropriate steering feeling. As described above, in the SBW system 902, a rotating machine for reaction force torque output or turning torque output is defined as a "multi-phase rotating machine". Regarding the reference numerals of the following "three-phase motors", "890" is omitted from "800, 890" and only "800" is described.

In the SBW system 902 of FIG. 3, the three DC motors 710, 720, and 730 as "DC rotating machines" are used in the same manner as the column type EPS system 901 of FIG. 1. Hereinafter, in the description of anomaly detection of the three-phase motor 800 and the DC motors 710, 720, and 730 by the ECU 10, there is no substantial difference between the EPS system 901 and the SBW system 902.

Next, a connection configuration of devices will be described with reference to FIGS. 5 and 6. The three-phase motor 800 of the present embodiment is configured as a "mechanical-electrically integrated" brushless motor in which the ECU 10 is integrally configured on one side in the axial direction. On the other hand, the DC motors 710, 720, and 730 are connected to the ECU 10 via connectors, respectively. That is, while the connection between the three-phase motor 800 and the ECU 10 is a necessary prerequisite, the DC motors 710, 720, 730 and the ECU 10 are configured to be connectable as options according to needs. For example, the circuit board on the ECU 10 side may be shared, and the connector specifications and related electronic components may be add-on devices as options.

Figure 5:
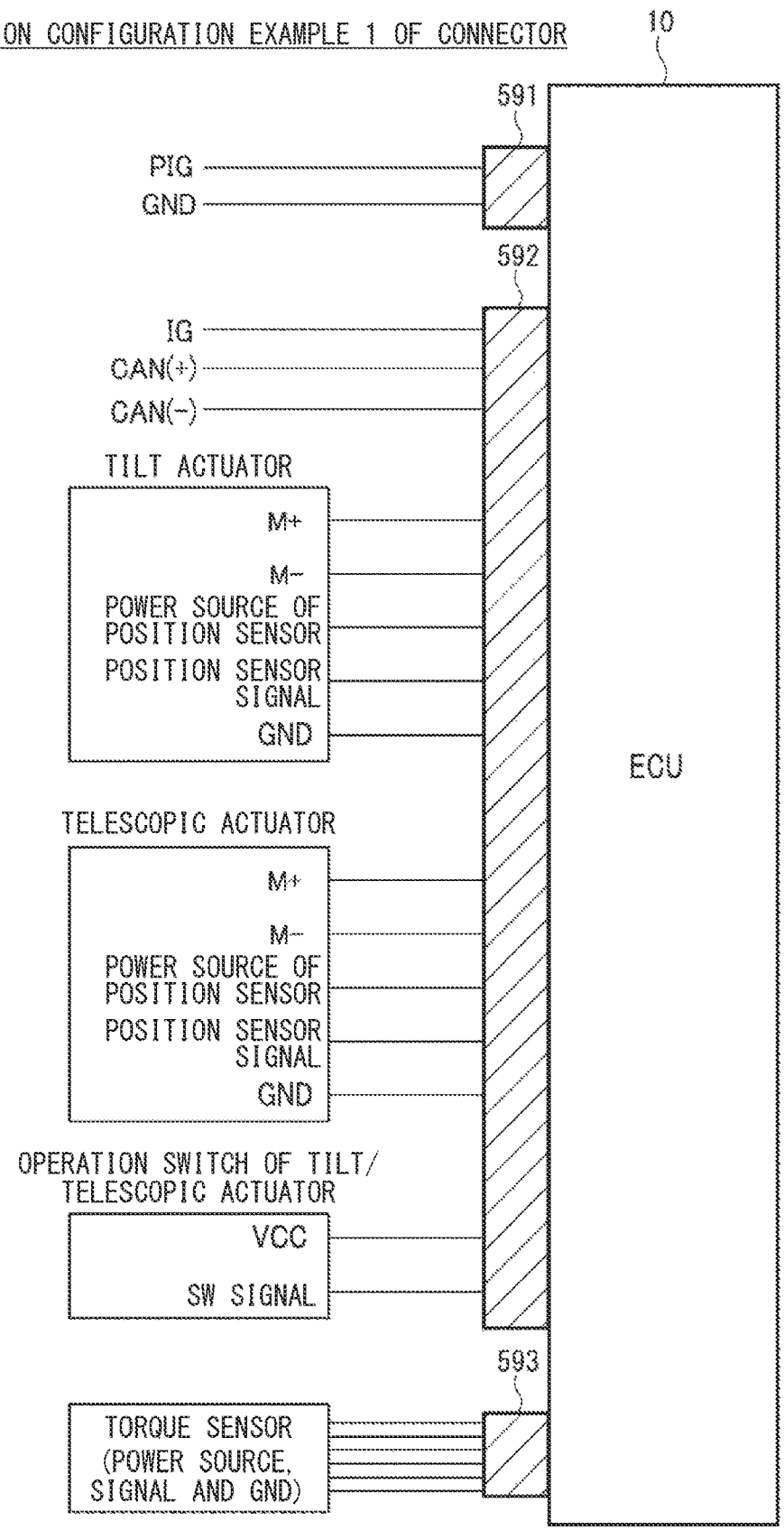
FIG. 5 is a diagram illustrating a connection configuration example 1 of a connector.

FIG. 5 shows an example of a connector connection configuration in a system provided with two DC motors, i.e., a tilt actuator 710 and a telescopic actuator 720. In this connection configuration example, a power system connector 591, a signal system connector 592, and a torque sensor connector 593 are provided separately. To the power system connector 591, a power supply line (PIG) from a DC power supply and a ground line are connected. In addition to the control power supply line (IG) and CAN communication line, the wiring of each DC motor 710 and 720 is connected to the signal system connector 592. A power supply line, a signal line, and a ground line of the torque sensor 94 are collectively connected to the torque sensor connector 593.

Motor lines (M+, M−), a position sensor power supply line, a position sensor signal line, and a ground line are connected to the tilt actuator 710 and the telescopic actuator 720. By determining that a predetermined position has been reached by torque or current and time, or by flowing a constant current or applying a voltage according to the on/off state of the tilt switch 12 and the telescopic switch 13, it is also possible to have a configuration without a position sensor power line and a position sensor signal line and without using the position sensor. A signal may be received from the tilt switch 12 and the telescopic switch 13 by CAN communication or serial communication, or an analog voltage signal may be received. These signals can be communicated using the signal system connector 592.

Although motor lines (M+, M−) of each of the DC motors 710, 720 are power systems, the motor lines can be included in the signal system connector 592 and connected because of having a motor current smaller than that of the three-phase motor 800. When the current of each of the DC motors 710, 720 is large, another connector may be used, or a connector common to the power system connector 591 of the power supply line (PIG) from the DC power supply and the ground line may be used. The connector may be divided for each of the DC motors 710 and 720.

Figure 6:
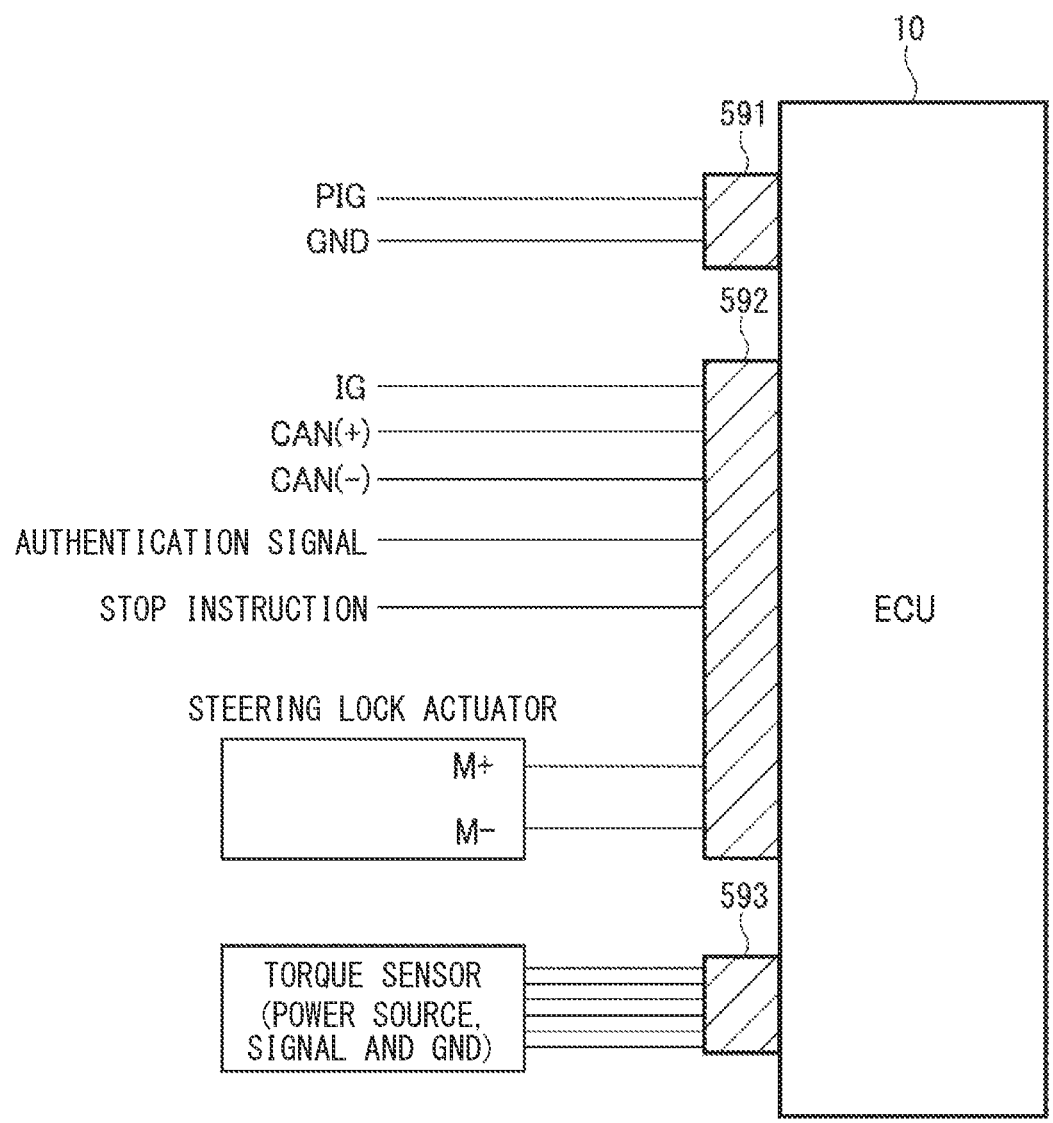
FIG. 6 is a diagram illustrating a connection configuration example 2 of a connector.

FIG. 6 shows an example of a connector connection configuration in a system provided with a steering lock actuator 730 as a single DC motor. In contrast to the configuration of FIG. 5, in the signal system connector 592, instead of each line of the tilt actuator 710 and the telescopic actuator 720, an authentication signal line, a stop command signal line, and a motor line (M+, M−) of the steering lock actuator 730 are connected. Other notes are the same as the notes relating to FIG. 5.

[Motor Drive Circuit Configuration]

Next, the configuration of the drive circuit of the three-phase motor 800 and one or more DC motors will be described with reference to FIGS. 7 to 11. In the description of this part, the circuit configuration for driving the three-phase motor 800 and the two DC motors 710 and 720 will be shown. Further, a configuration example of a latch circuit for self-holding even if the activation signal is turned off after the ASIC of the ECU 10 and the microcomputer are activated is described.

Figure 7:
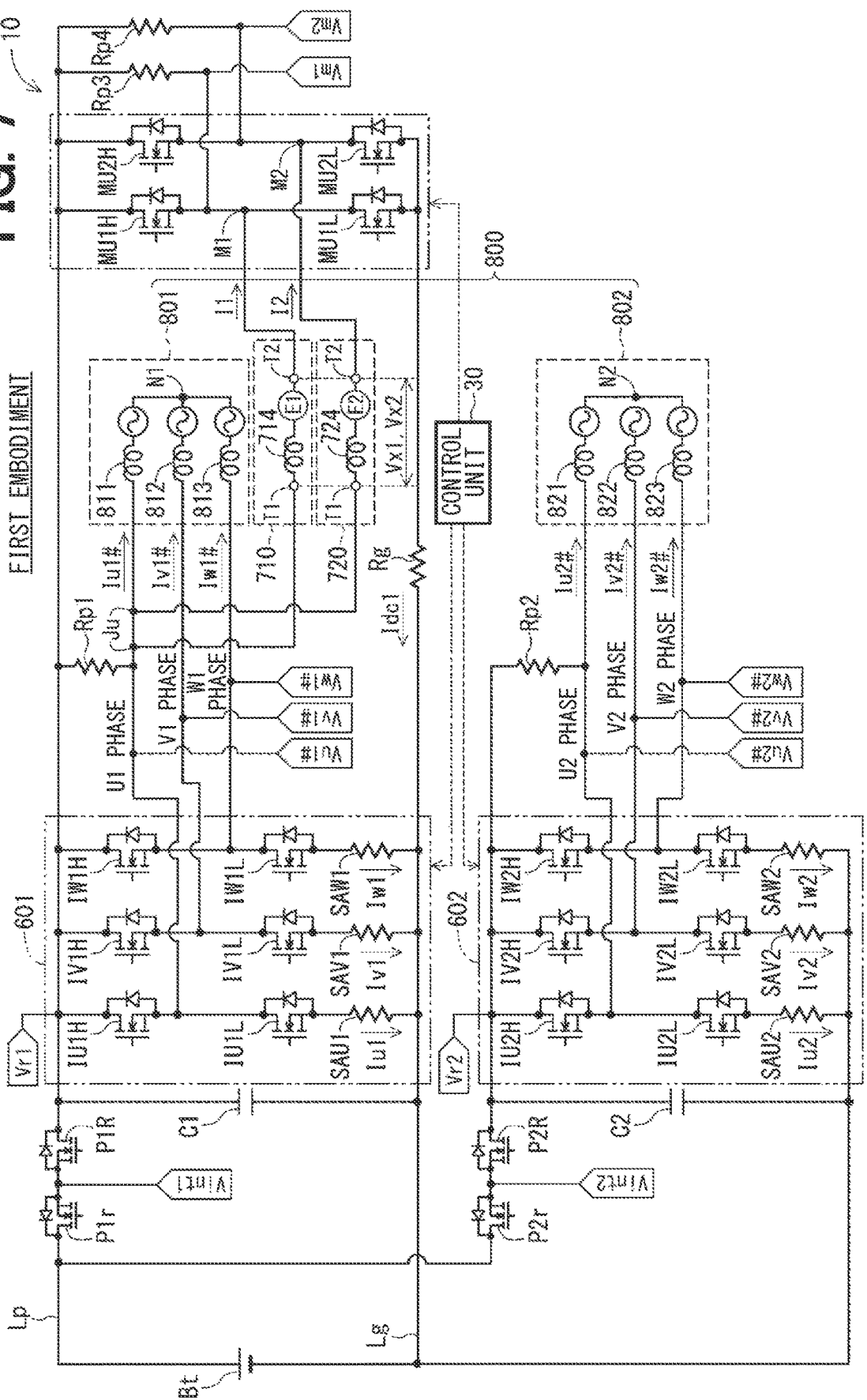
FIG. 7 is a diagram showing a configuration of a drive circuit of the first embodiment (with two systems)
Figure 11:
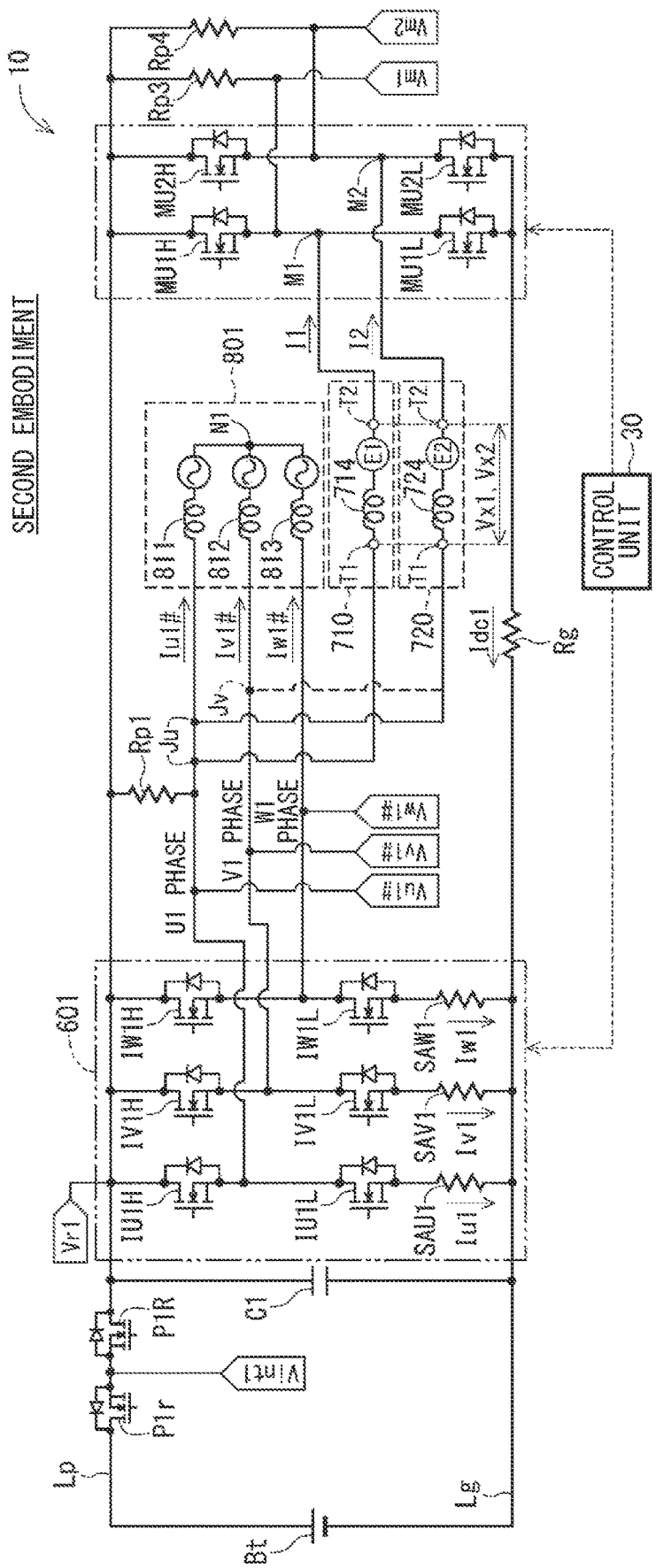
FIG. 11 is a configuration diagram of a drive circuit of a second embodiment (with one system)

Concerning the configuration of the three-phase motor 800, a unit including each of three-phase winding sets and constituent elements such as an inverter corresponding to the winding set is referred to as a "system". FIG. 7 shows a drive circuit having a two-system configuration as the first embodiment, and FIG. 11 shows a drive circuit having a one-system configuration as the second embodiment. In the following description, first and second embodiments are collectively referred to as a present embodiment. At the end of each of the reference characters and symbols of the two-system configuration, "1" is added for a configuration of a first system, and "2" is added for a configuration of a second system. In the one-system configuration, the reference characters and symbols of the first system in the two-system configuration are used. "10" is commonly used as the character of the ECU. Of the elements shown in each figure, the portion other than the three-phase motor 800 and the DC motors 710 and 720 is the ECU 10.

First Embodiment

Figure 8:
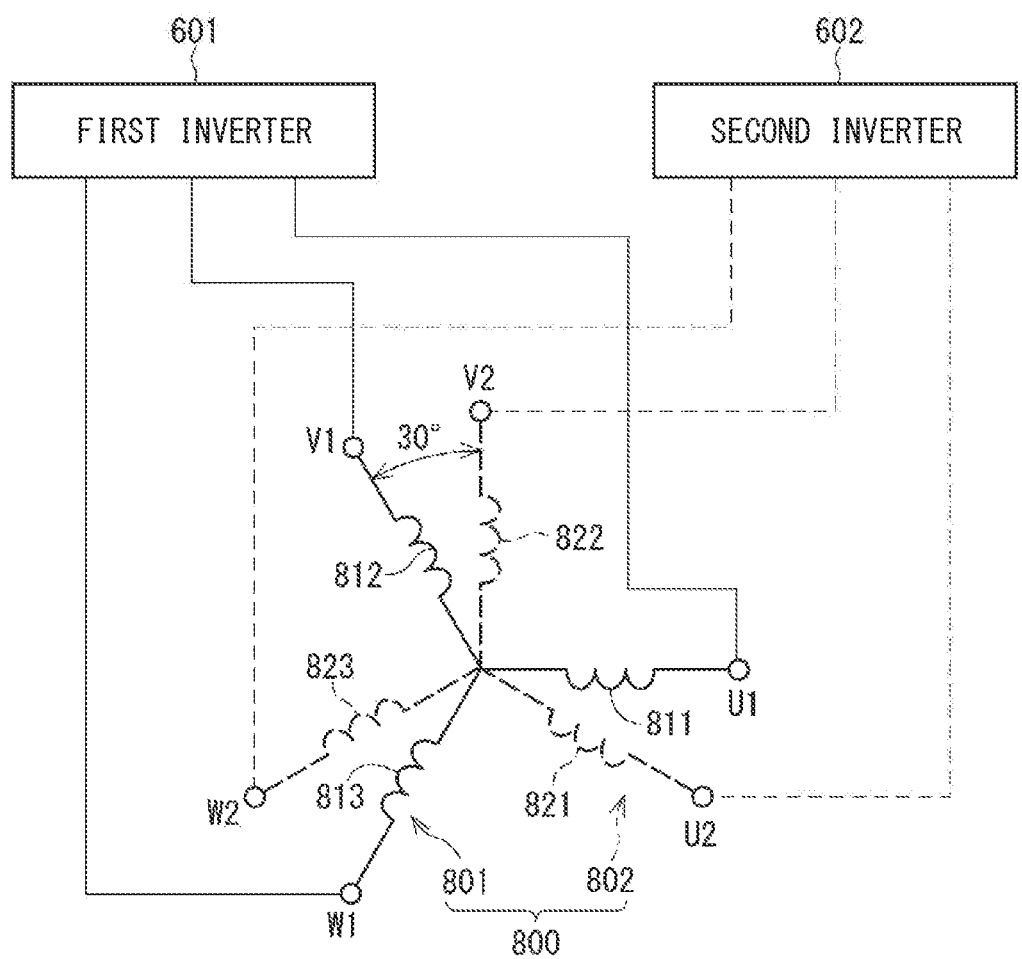
FIG. 8 is a schematic diagram illustrating a configuration of a three-phase double winding rotating machine.

FIGS. 7 and 8 show the overall configuration of the ECU 10 of the first embodiment in which the two-system three-phase motor 800 is a drive target. The ECU 10 includes two inverters 601 and 602 as "multi-phase power converters", four DC motor switches MU1H, MU1L, MU2H, MU2L as "switches for DC rotary machines", and a control unit 30. The two inverters 601 and 602 function as a drive circuit for the three-phase motor 800.

Further, in the inverters 601 and 602, a set of high-potential side and low-potential side switching elements connected in series is used as a leg. In the present embodiment, the drive circuit of the DC motors 710 and 720 is configured by the one-phase leg of either inverter and the switches for the DC motor on the high potential side and the low potential side. In other words, the one-phase leg of either inverter is shared as the drive circuit of the DC motors 710 and 720. The specific configuration will be described later.

First, the motors 800, 710, and 720 as the drive target will be described. The three-phase motor 800 has two sets of three-phase winding sets 801 and 802. The first system three-phase winding set (hereinafter referred to as "first three-phase winding set") 801 is configured by connecting U1 phase, V1 phase, and W1 phase windings 811, 812, and 813 at the neutral point N1. A voltage is applied from a first system inverter (hereinafter, "first inverter") 601 to the U1-phase, V1-phase, and W1-phase windings 811, 812, 813 of the first three-phase winding set 801.

The second system three-phase winding set (hereinafter referred to as "second three-phase winding set") 802 is configured by connecting U2 phase, V2 phase, and W2 phase windings 821, 822, and 823 at the neutral point N2. A voltage is applied from a second system inverter (hereinafter, "second inverter") 602 to the U2-phase, V2-phase, and W2-phase windings 821, 822, 823 of the second three-phase winding set 802.

As shown in FIG. 8, the three-phase motor 800 is a double-winding rotating machine in which two sets of three-phase winding sets 801 and 802 are coaxially provided. The two sets of three-phase winding sets 801 and 802 have the same electrical characteristics, and are arranged, for example, on a common stator with an electrical angle of 30 [deg] offset from each other. In this case, the counter-electromotive voltages generated in the respective phases of each of the first system and the second system are expressed by, for example, equations (1.1) to (1.3) and (1.4a) to (1.6a) on the basis of a voltage amplitude A, a rotational speed ω, and a phase θ.

$$Eu1 = -A\omega \sin\theta \tag{1.1}$$

$$Ev1 = -A\omega \sin(\theta-120) \tag{1.2}$$

$$Ew1 = -A\omega \sin(\theta+120) \tag{1.3}$$

$$Eu2 = -A\omega \sin(\theta+30) \tag{1.4a}$$

$$Ev2 = -A\omega \sin(\theta-90) \tag{1.5a}$$

$$Ew2 = -A\omega \sin(\theta+150) \tag{1.6a}$$

When the phase relationship between the two systems is reversed, for example, the phase (θ+30) of the U2 phase is converted to (θ−30). In that case, the counter electromotive voltage generated in each phase of the second system is represented by the equations (1.4b) to (1.6b) instead of the equations (1.4a) to (1.6a). Further, the phase difference equivalent to 30 [deg] is generally expressed as (30±60×k) [deg] (k is an integer). Alternatively, the second system may be disposed in the same phase as the first system.

$$Eu2 = -A\omega \sin(\theta-30) \tag{1.4b}$$

$$Ev2 = -A\omega \sin(\theta+90) \tag{1.5b}$$

$$Ew2 = -A\omega \sin(\theta-150) \tag{1.6b}$$

The DC motor 710 is configured to include a winding of one phase in one of the systems (i.e., a U1 phase winding 811 in the example of FIG. 7) and a winding 714 connected to a motor terminal M1 between the DC motor switches MU1H and MU1L. At the time of energization of the DC motor 710, a counter-electromotive voltage E1 proportional to a rotational speed ω1 is generated. When the proportionality constant is defined as EA1, the counter electromotive voltage E1 is expressed by the equation "$E1 = -EA1 \times \omega1$". Further, the direct current applied to the direct current motor 710 is referred to as I1.

The DC motor 720 is configured to include a winding of one phase in one of the systems (i.e., a U1 phase winding 811 in the example of FIG. 7) and a winding 724 connected to a motor terminal M2 between the DC motor switches MU2H and MU2L. At the time of energization of the DC motor 720, a counter-electromotive voltage E2 proportional to a rotational speed ω2 is generated. When the proportionality constant is defined as EA2, the counter electromotive voltage E2 is expressed by the equation "$E2 = -EA2 \times \omega2$". Further, the direct current applied to the direct current motor 720 is referred to as I2.

Next, the drive circuit of the ECU 10 will be described. Each terminal voltage is detected in an anomaly check described later. The first inverter 601 is connected to the positive electrode of the power supply Bt via the high potential line Lp, and is connected to the negative electrode of the power supply Bt via the low potential line Lg. The power supply Bt is, for example, a battery having a reference voltage of 12 [V]. Further, the DC voltage input from the power supply Bt to the first inverter 601 is referred to as "input voltage Vr1". A capacitor C1 is provided between the high potential line Lp and the low potential line Lg on the power supply Bt side of the first inverter 601.

The first inverter 601 converts the DC power of the power supply Bt into three-phase AC power by the operation of a plurality of bridge-connected inverter switching elements IU1H, IU1L, IV1H, IV1L, IW1H, and IW1L on the high potential side and the low potential side. The inverter 601 then applies a voltage to each of the phase windings 811, 812, 813 of the first three-phase winding set 801.

Specifically, the inverter switching elements IU1H, IV1H, and IW1H are upper arm elements provided on the high potential side of the U1 phase, the V1 phase, and the W1 phase, respectively, and the inverter switching elements IU1L, IV1L, and IW1L are U1 phase and V1 are lower arm elements provided on the low potential side of the U1 phase, the V1 phase, and the W1 phase. Hereinafter, the upper arm element and the lower arm element of the same phase are collectively referred to as "IU1H/L, IV1H/L, IW1H/L". Each switch used in this embodiment, including the inverter switching elements IU1H/L, IV1H/L, and IW1H/L, is, for example, a MOSFET. Each switch may be a field effect transistor other than the MOSFET, an IGBT, or the like.

Current sensors SAU1, SAV1, and SAW1 for detecting the phase currents Iu1, Iv1, and Iw1 flowing through each phase are arranged between the lower arm elements IU1 L, IV1L, and IW1L of each phase of the first inverter 601 and the low potential line Lg1. The current sensors SAU1, SAV1, and SAW1 include, for example, a shunt resistor. The phase currents energized in the first three-phase winding set 801 are referred to as Iu1 #, Iv1 #, and Iw1 #with respect to the phase currents Iu1, Iv1, and Iw1 flowing through the first inverter 601. The relationship between both phase currents will be described later. Further, the post-operation voltage of each phase winding is described as "winding voltage Vu1 #, Vv1 #, Vw1 #".

In the current path between the power supply Bt and the capacitor C1, the power supply relay P1r is connected in series on the power supply Bt side, and the reverse connection protection relay P1R is connected in series on the capacitor C1 side. The power supply relay P1r and the reverse connection protection relay P1R includes a semiconductor switching element such as a MOSFET, a mechanical relay, and the like, and can cut off the energization from the power supply Bt to the inverter 601 when the power supply Bt is turned off. The power relay P1r cuts off the current in the flowing direction when the electrodes of the power Bt are connected in the normal direction. The reverse connection protection relay P1R cuts off the current in the flowing direction when the electrodes of the power supply Bt are connected in the direction opposite to the normal direction.

The relay P1r and the reverse connection protection relay P1R constitute an "input circuit" for inputting electric power from the power supply Bt to the "drive circuit of the three-phase motor 800 and the DC motors 710 and 720". Further, the voltage of the current path between the power supply relay P1r and the reverse connection protection relay P1R is referred to as "inter-relay voltage Vint1".

Regarding the second system, the symbols of the switching element and the current sensor of the inverter (hereinafter referred to as "second inverter") 602, the power supply relay and the reverse connection protection relay, and the symbols of current and voltage are defined by replacing the symbol "1" in the first system with "2". Further, regarding the elements of the second system, the description of the elements of the first system is incorporated. In the drive circuit shown in FIG. 7, two inverters 601 and 602 are connected to a common power supply Bt, alternatively, in other embodiments, the inverters 601 and 602 may be connected to individual power supplies.

In the configuration example of FIG. 7, the two DC motors 710 and 720 are connected to the U1 phase winding 811 of the first three-phase winding set 801. A DC motor switch as a "DC rotating machine switch" corresponding to the DC motor 710 is made up of a switch MU1H on a high potential side and a switch MU1L on a low potential side, which are connected in series via a DC motor terminal M1. The DC motor switch corresponding to the DC motor 720 includes a high potential side switch MU2H and a low potential side switch MU2L connected in series via the DC motor terminal M2.

Similar to the inverter switching element, the switches on the high potential side and the low potential side are collectively referred to as "MU1H/L, MU2H/L" for the DC motor switch. The DC motor switches MU1H/L and MU2H/L are provided between the high potential line Lp and the low potential line Lg in parallel with the first inverter 601 with respect to the power supply Bt common to the first inverter 601.

The first terminal T1 which is one end of the DC motors 710 and 720 is connected to the branch point Ju of the U1 phase current path of the first three-phase winding set 801. The second terminal T2, which is the end opposite to the first terminal T1 of the DC motors 710 and 720, is connected to the DC motor terminals M1 and M2 of the DC motor switches MU1H/L and MU2H/L, respectively. The voltages of the DC motor terminals M1 and M2 are referred to as "DC motor terminal voltages Vm1 and Vm2". The DC motor switch MU1H/L is connected to the U1 phase winding 811 via the DC motor 710, and the DC motor switch MU2H/L is connected to the U1 phase winding 811 via the DC motor 720. The symbols "MU1H/L" and "MU2H/L" of the switch for the DC motor relate to the U1 phase, "1" relates to the first DC motor 710, and "2" relates to the second DC motor 720.

In the DC motors 710 and 720, the direction of the currents I1 and I2 from the first terminal T1 to the second terminal T2 is defined as the positive direction, and the direction of the currents I1 and I2 from the second terminal T2 to the first terminal T1 is defined as the negative direction. A voltage Vx1 is applied between the first terminal T1 and the second terminal T2 of the DC motor 710, and a voltage Vx2 is applied between the first terminal T1 and the second terminal T2 of the DC motor 720. Due to space limitations in the drawings, the symbols Vx1 and Vx2 are listed side by side. The DC motors 710, 720 rotate forward when energized in the positive direction, and rotate backward when energized in the negative direction.

In the example of FIG. 7, a part of the phase current Iu1 is separated as the DC motor currents I1 and I2 at the branch point Ju of the U1 phase current path. Therefore, the relationship between the inverter phase currents Iu1, Iv1, Iw1 flowing on the inverter 601 side of the branch point Ju and the motor phase currents Iu1 #, Iv1 #, Iw1 #energized on the three-phase motor 800 side of the branch point Ju is represented by the equations (2.1) to (2.4). The total values of the currents I1 and I2 may be detected by using the ground resistance Rg described later, or the respective currents may be detected by shifting the on-timing of the DC motor switch.

$$Iu1 \# = -Iv1 - Iw1 \quad (2.1)$$

$$Iv1 \# = Iv1 \quad (2.2)$$

$$Iw1 \# = Iw1 \quad (2.3)$$

$$I1 + I2 = Iu1 - Iu1 \# \quad (2.4)$$

The DC motor switches MU1H/L and MU2H/L change the voltage Vm1 of the DC motor terminal M1 and the voltage Vm2 of the DC motor terminal M2, respectively, by the switching operation using the duty control or the like. Here, since the currents I1 and I2 energized in the DC motors 710 and 720 have smaller absolute values than the phase current flowing in the three-phase motor 800, the DC motor switches MU1H/L and MU2H/L may be switches having a current capacity smaller than that of inverter switching elements IU1H/L, IV1H/L, IW1H/L, IU2H/L, IV2H/L, and IW2H/L.

Further, in the drive circuit of FIG. 7, a plurality of pull-up resistors Rp1 to Rp4 are provided for detecting the terminal voltage for checking the anomaly. The pull-up resistance Rp1 is connected between the U1 phase winding 811 of the first system and the high potential line Lp. The pull-up resistor Rp2 is connected between the U2 phase winding 821 of the second system and the high potential line Lp. The pull-up resistors Rp3 and Rp4 are connected between the DC motor terminals M1 and M2 and the high potential line Lp, respectively. In summary, the pull-up resistor Rp is connected between the winding of any one or more phases of the three-phase motor 800 and the high potential line Lp, or between any one or more DC motor terminals and the high potential line Lp. In addition, the low potential line Lg is provided with a ground resistor Rg used for detecting the direct current Idc1.

Figure 16:
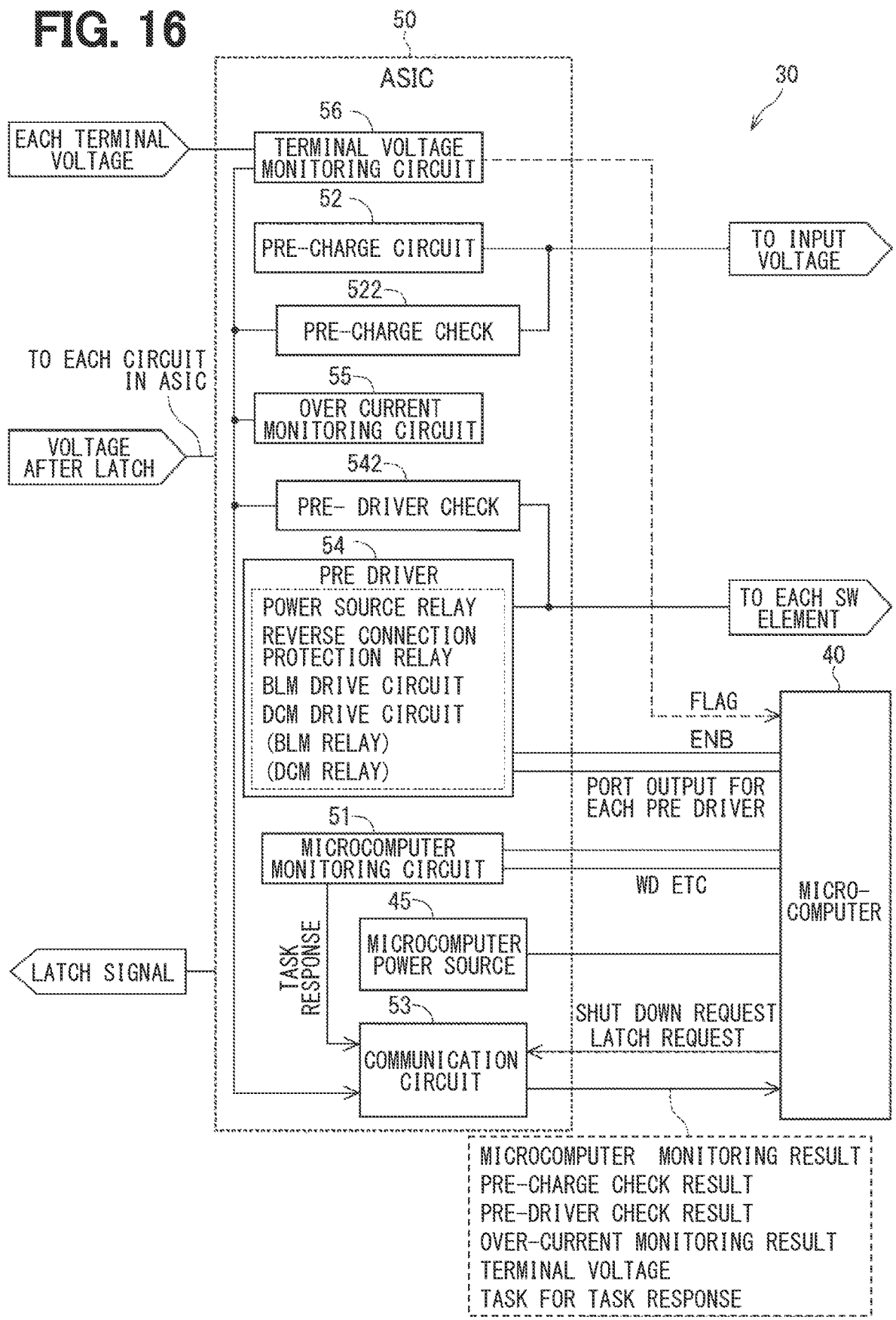
FIG. 16 is a diagram showing an anomaly detection configuration by an ASIC and a microcomputer.

The control unit 30 includes a microcomputer 40 that performs control calculations, an ASIC 50 that is an integrated circuit for a specific application, and the like (see FIG. 16). The control unit 30 includes a CPU (not shown), a ROM, a RAM, an I/O, a bus line connecting these configurations, and a like, and executes a control by the software process with performing, by the CPU, the program stored in advance in a tangible memory device such as a ROM (that is, a readable non-transitory tangible storage medium); or by the hardware processing with the dedicated electronic circuit.

The control unit 30 controls the operation of inverter switching elements IU1H/L, IV1H/L, IW1H/L, IU2H/L, IV2H/L, IW2H/L in two systems and two sets of DC motor switches MU1H/L and MU2H/L. By controlling the neutral point voltages Vn1 and Vn2 and the motor terminal voltages Vm1 and Vm2, the three-phase motor 800 and the two DC motors 710 and 720 are comprehensively driven. Here, the drive control of the three-phase motor 800 is carried out by vector control, feedback control with respect to the current command value, or the like, and the drive control of the DC motors 710 and 720 is carried out by feedback control with respect to the current command value or the like. In this specification, detailed description about drive control is not described.

Figure 21:
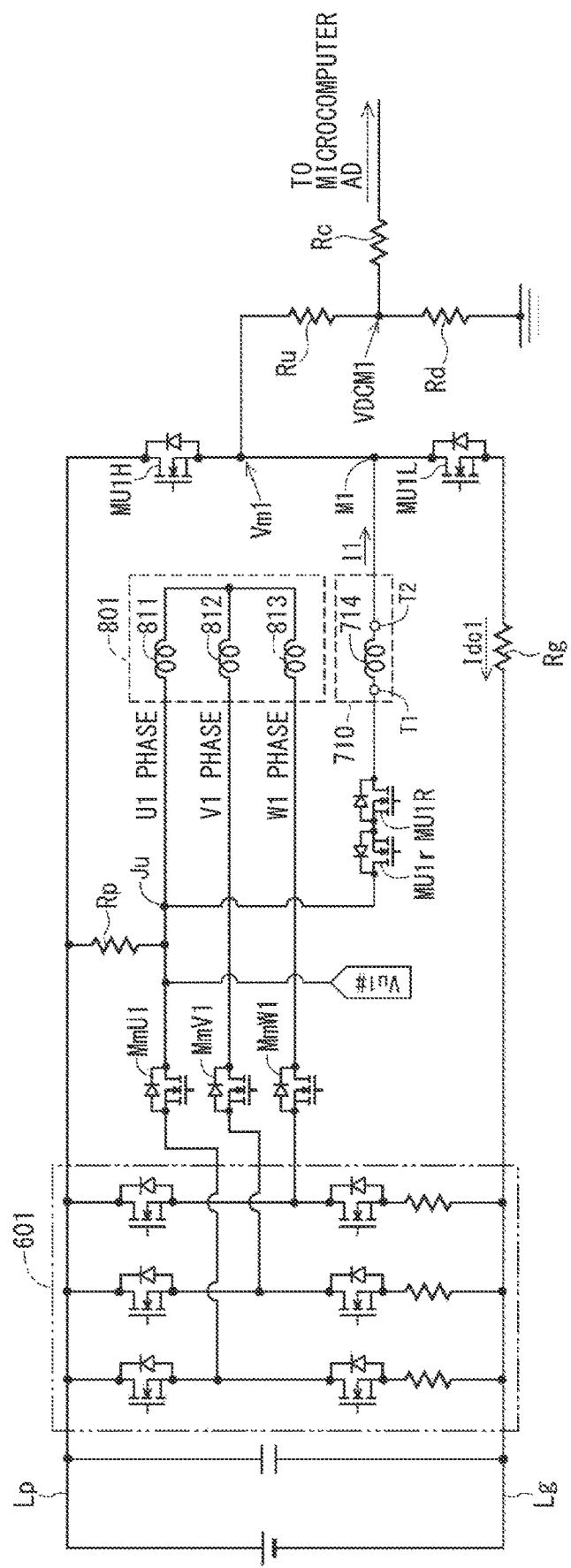
FIG. 21 is a circuit diagram used for explaining anomaly detection of a DCM drive circuit.

Further, although the signal line arrow is omitted, the control unit 30 operates the power supply relays P1r and P2r and the reverse connection protection relays P1R and P2R at the time of starting. Further, as shown in FIG. 21, in the configuration in which the three-phase motor relays MmU1, MMV1, MmW1 and the DC motor relays MU1r and MU1R are provided, those relays are operated. In addition, as will be described later, the control unit 30 checks for anomaly in the drive circuit, the motor, the wiring, and the like at the activation time and during ordinary operation.

Figure 9:
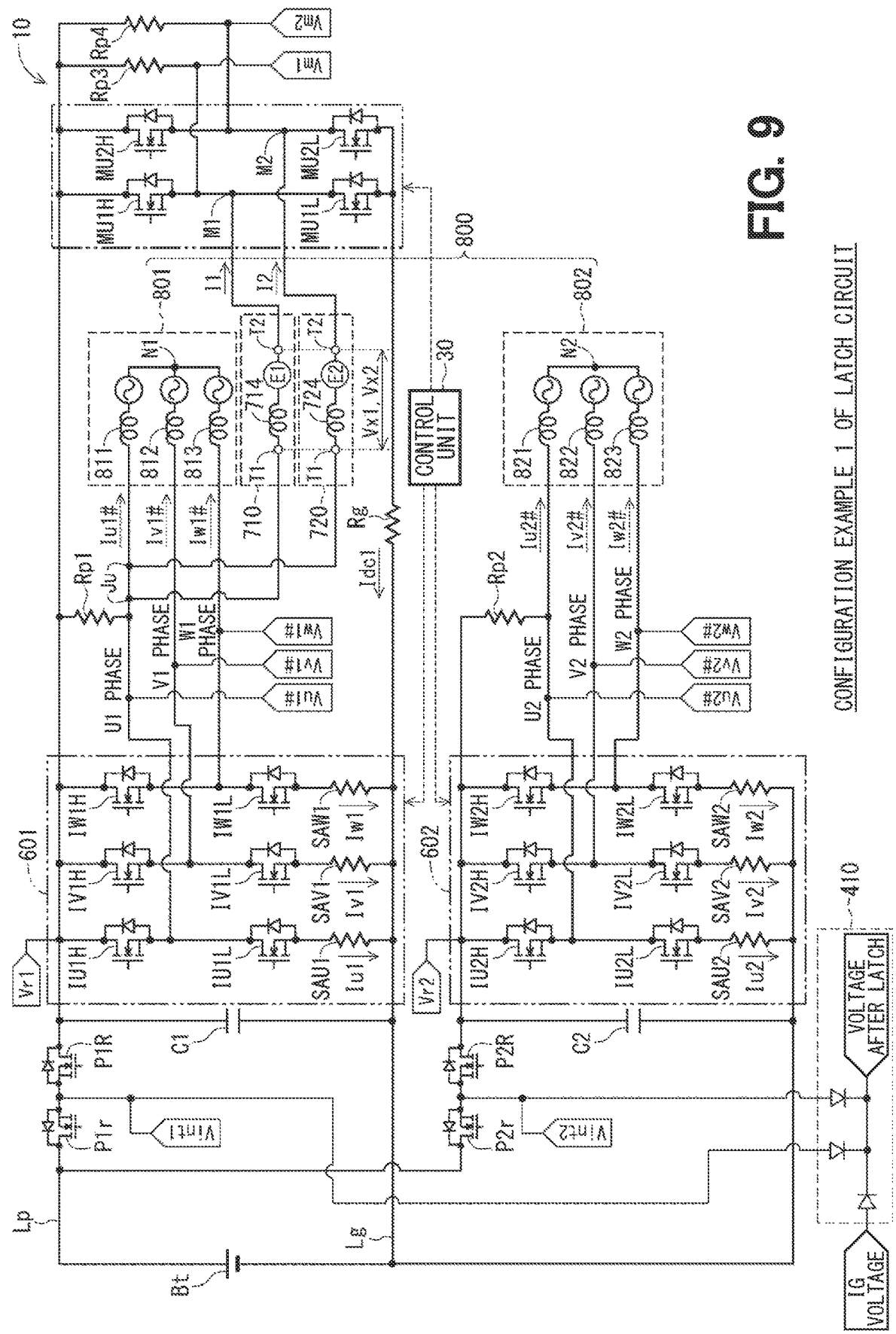
FIG. 9 is a diagram of a configuration example 1 of the latch circuit for the drive circuit of FIG. 7.
Figure 10:
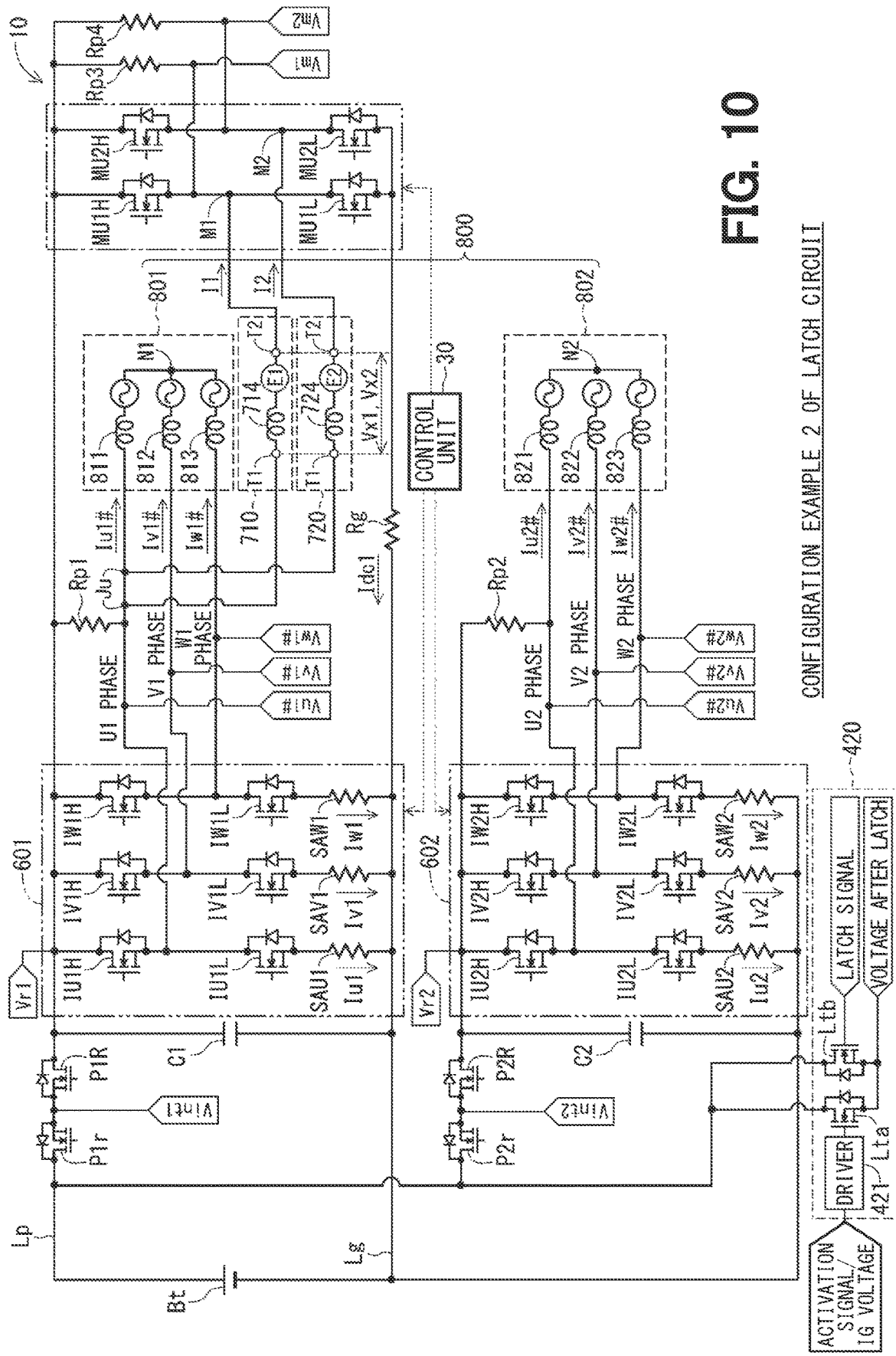
FIG. 10 is a diagram of a configuration example 2 of the latch circuit for the drive circuit of FIG. 7.

Next, with reference to FIGS. 9 and 10, a configuration example of the drive circuit latch circuit of FIG. 7 is shown. In the sequence described later with reference to FIGS. 17 and 18, the latch circuit is a circuit for self-holding even if the activation signal is turned off after the ASIC and the microcomputer of the ECU 10 are activated. As the activation signal, an IG (ignition) voltage signal in an engine vehicle is exemplified. As shown in FIG. 16, the "post-latch voltage" generated by the latch circuit is input to each circuit in the ASIC 50 which is a part of the anomaly detection unit, and as a result, the microcomputer 40 is activated.

In the latch circuit 410 of the configuration example 1 shown in FIG. 9, the IG voltage is first applied through the diode to generate the post-latch voltage. Next, when at least one of the power supply relays P1r and P2r i two systems is turned on, the inter-relay voltage Vint1 or Vint2 is applied through the diode to continuously generate a post-latch voltage. After that, even if the input of the IG voltage is stopped, the post-latch voltage is maintained unless the power supply relays P1r and P2r are turned off.

The latch circuit 420 of the configuration example 2 shown in FIG. 10 includes a driver 421 made of a semiconductor, and two switches Lta and Ltb. When the two switches Lta and Ltb are MOSFETs, the drain terminal is connected to the positive electrode of the power supply Bt, and the source terminal is connected to the output terminal of the post-latch voltage. An input terminal for a activation signal or an IG voltage is connected to the gate of one switch Lta via a driver 421. An input terminal for a latch signal is connected to the gate of the other switch Ltb.

First, when the activation signal or the IG voltage is input to the driver 421 and the on-state signal is output from the driver 421 to the gate of the switch Lta, the switch Lta is turned on and the post-latch voltage is generated by the voltage of the power supply Bt. Next, when a latch signal is input to the gate of the switch Ltb, the switch Ltb is turned on and a post-latch voltage is continuously generated. After that, even if the input of the activation signal or the IG voltage is stopped, the post-latch voltage is maintained unless the latch signal is turned off. The latch circuit 420 may be provided in the ASIC 50 of FIG. 16.

Second Embodiment

FIG. 11 shows the overall configuration of the ECU 10 of the second embodiment in which the one-system three-phase motor 800 is a drive target. In contrast to the two-system configuration shown in FIG. 7, the three-phase motor 800 as the drive target does not have the second winding set 802. Correspondingly, the ECU 10 does not have the inverter 602 of the second system, the power supply relay P2r and the reverse connection protection relay P2R constituting the input circuit of the second system, and includes only the elements of the first system. In FIG. 11, the reference numerals and symbols of the first system in FIG. 7 are used.

The two DC motors 710 and 720 may be connected to the same U1 phase branch point Ju as shown by the solid line. Alternatively, as shown by the broken line, the second DC motor 720 may be connected to a branch point Jv of the V1 phase different from that of the first DC motor 710. In this way, the drive circuit of the DC motors 710 and 720 is configured by the one-phase or two-phase legs of the inverter 601 and the four DC motor switches MU1H/L and MU2H/L. In particular, since the description regarding the drive and anomaly detection of the DC motors 710 and 720 is common to the first and second embodiments, the following description will be made using a single drive circuit in one system having a simple configuration.

[Example of Terminal Voltage Detection Circuit Configuration, Example of Pull-Up Resistor Arrangement]

Figure 12A:
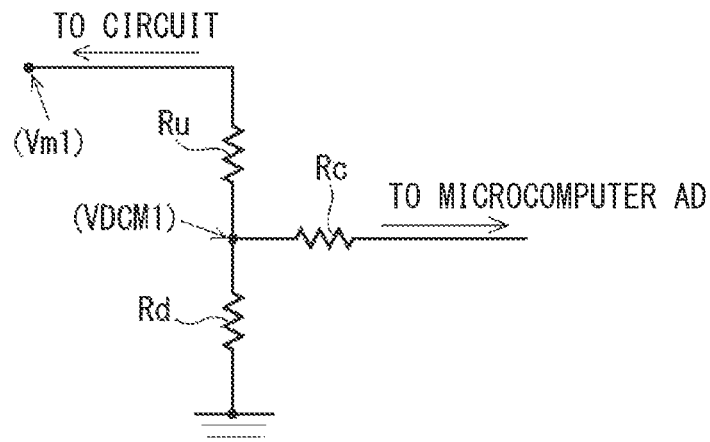
FIG. 12A is a diagram of a configuration example 1 of a terminal voltage detection circuit.
Figure 12B:
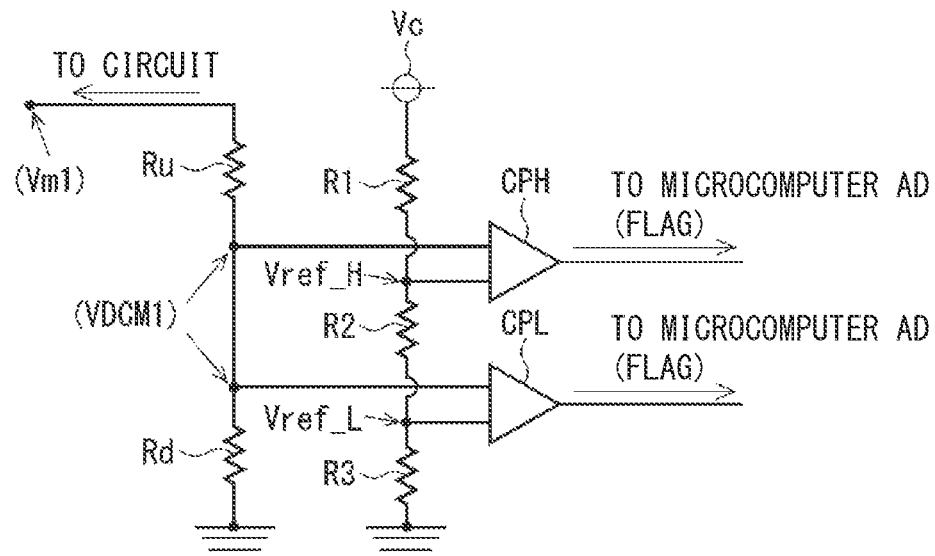
FIG. 12B is a diagram of a configuration example 2 of a terminal voltage detection circuit.

Next, a configuration example of the terminal voltage detection circuit will be described with reference to FIGS. 12A and 12B. FIGS. 12A and 12B show a detection circuit of the first DC motor terminal voltage Vm1 as an example, but other terminal voltages can be detected in the same manner. In the configuration example 1 shown in FIG. 12A, the terminal voltage Vm1 is divided by the upper resistor Ru and the lower resistor Rd, and the monitor voltage VDCM1 at the voltage dividing point is AD-converted and detected by the microcomputer 40 (see FIG. 16).

In the configuration example 2 shown in FIG. 12B, the monitor voltage VDCM1 at the voltage dividing point is input to the two comparators CpH and CpL. Further, the reference voltages Vref_H and Vref_L generated by dividing the voltage Vc by the three resistors R1, R2, and R3 are input to the comparators CpH and CpL, respectively. The comparators CpH and CpL compare the monitor voltage VDCM1 with the reference voltages Vref_H and Vref_L. A flag indicating the result is transmitted from the terminal voltage monitoring circuit 56 of the ASIC 50 to the microcomputer 40 (see FIG. 16).

Figure 13A:
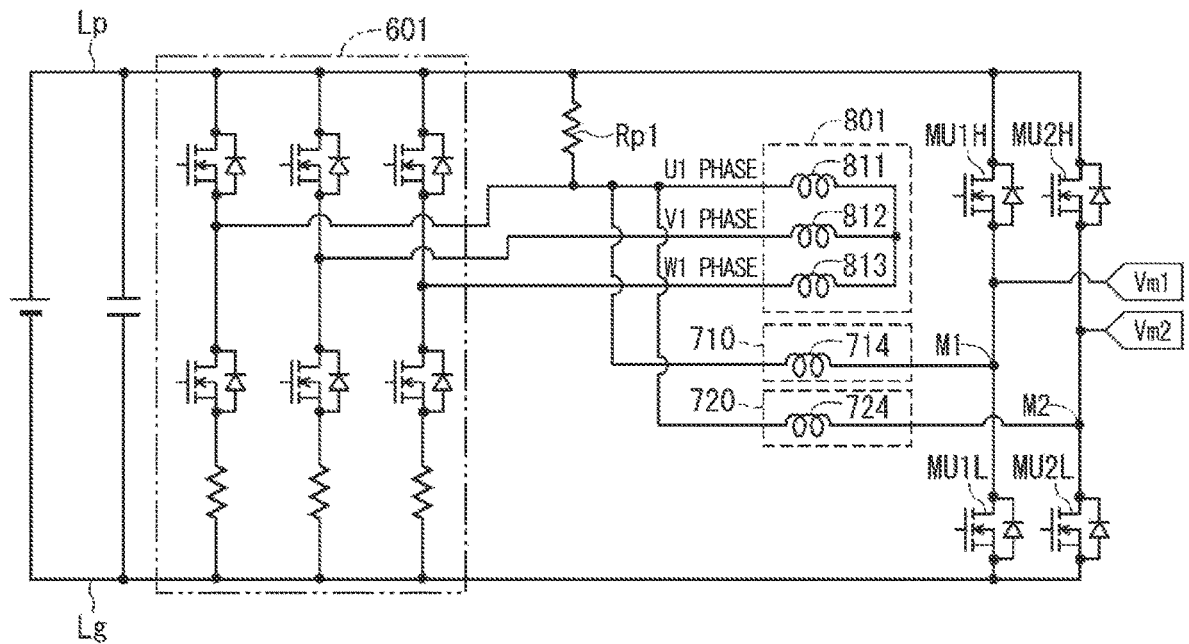
FIG. 13A is a diagram showing an example of arrangement of a pull-up resistor in a configuration in which two DC motors are connected in-phase.
Figure 13B:
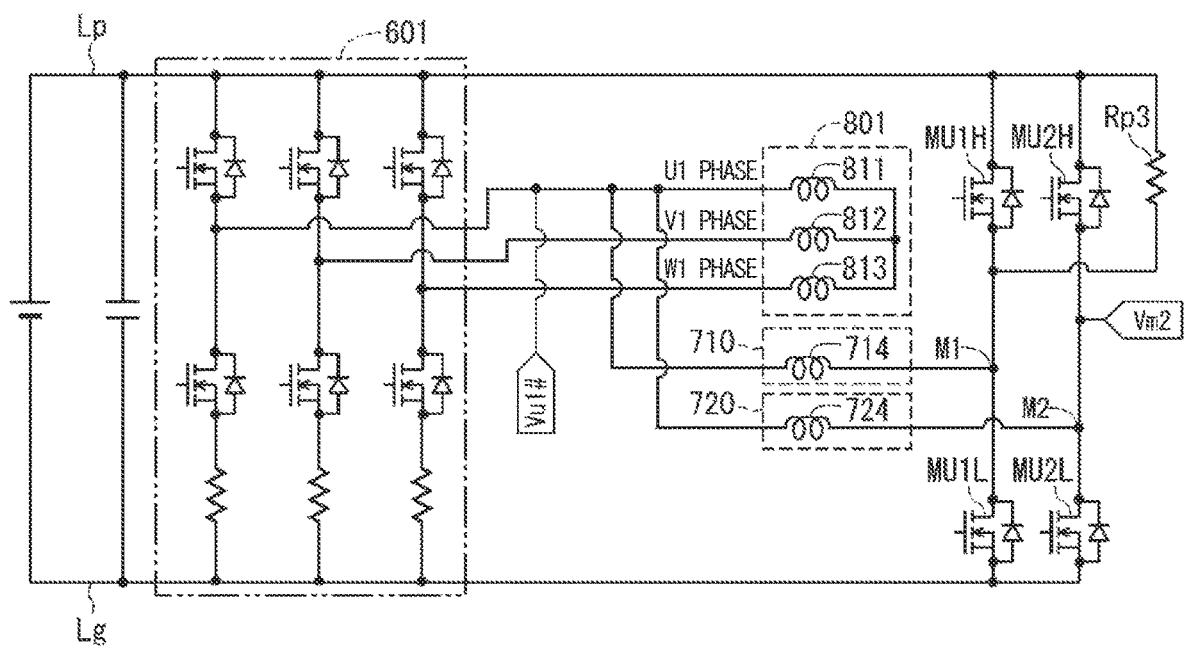
FIG. 13B is a diagram showing an example of arrangement of a pull-up resistor in a configuration in which two DC motors are connected in-phase.
Figure 14A:
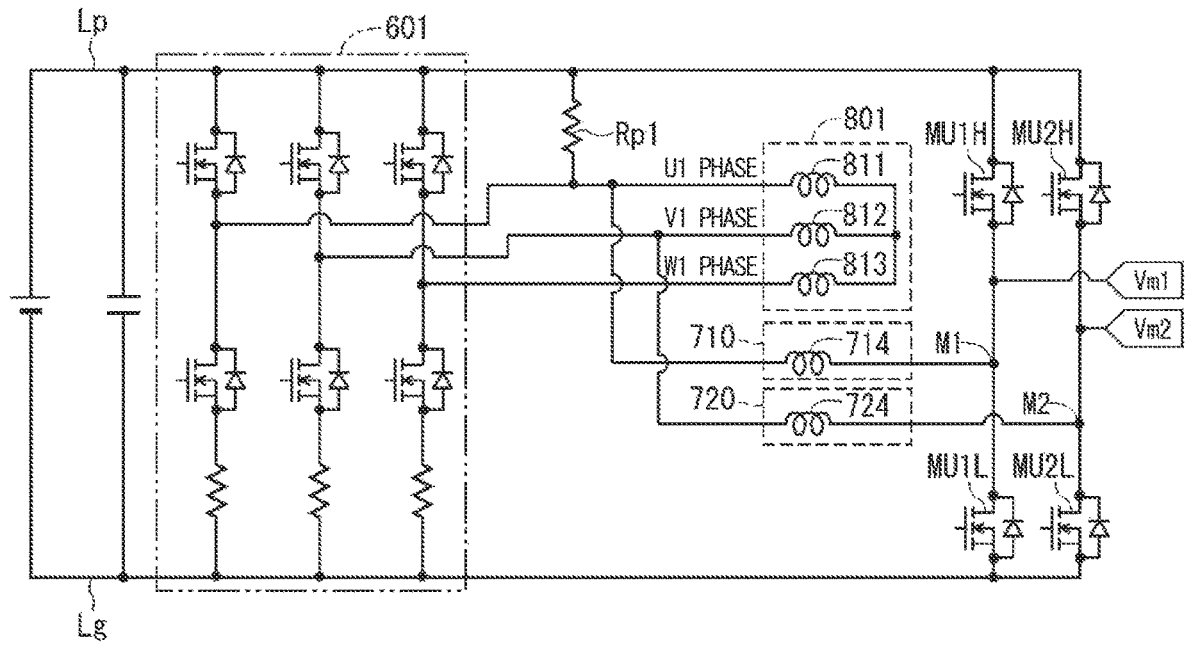
FIG. 14A is a diagram showing an example of arrangement of a pull-up resistor in a configuration in which two DC motors are connected out-of-phase.
Figure 14B:
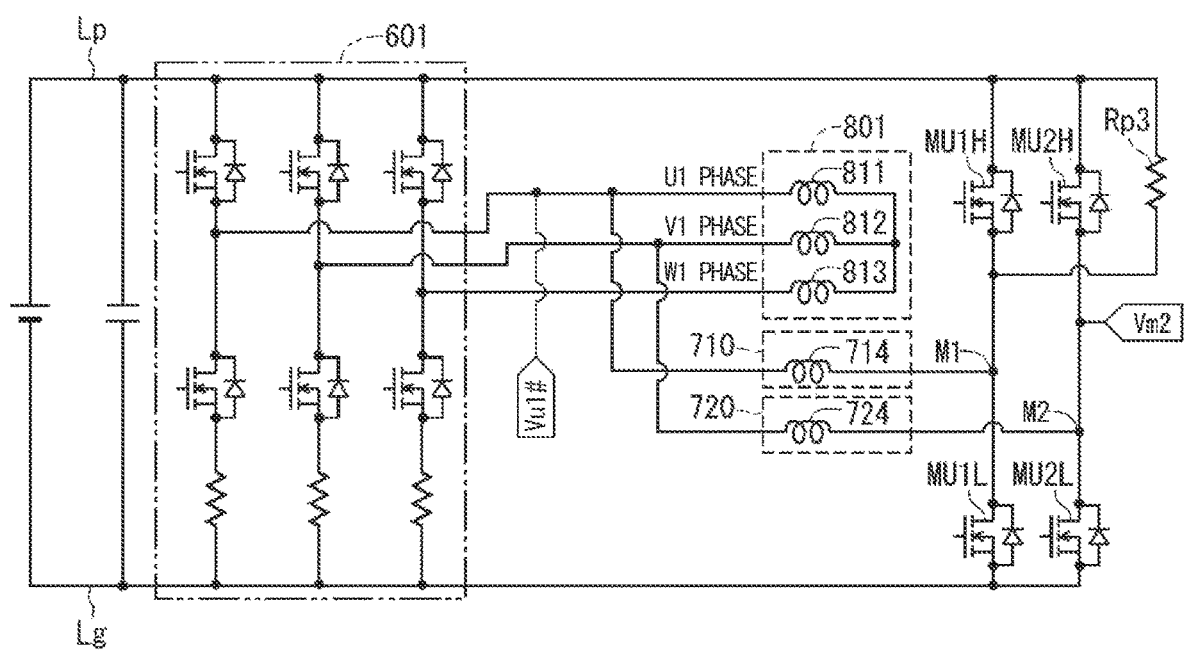
FIG. 14B is a diagram showing an example of arrangement of a pull-up resistor in a configuration in which two DC motors are connected out-of-phase.
Figure 15A:
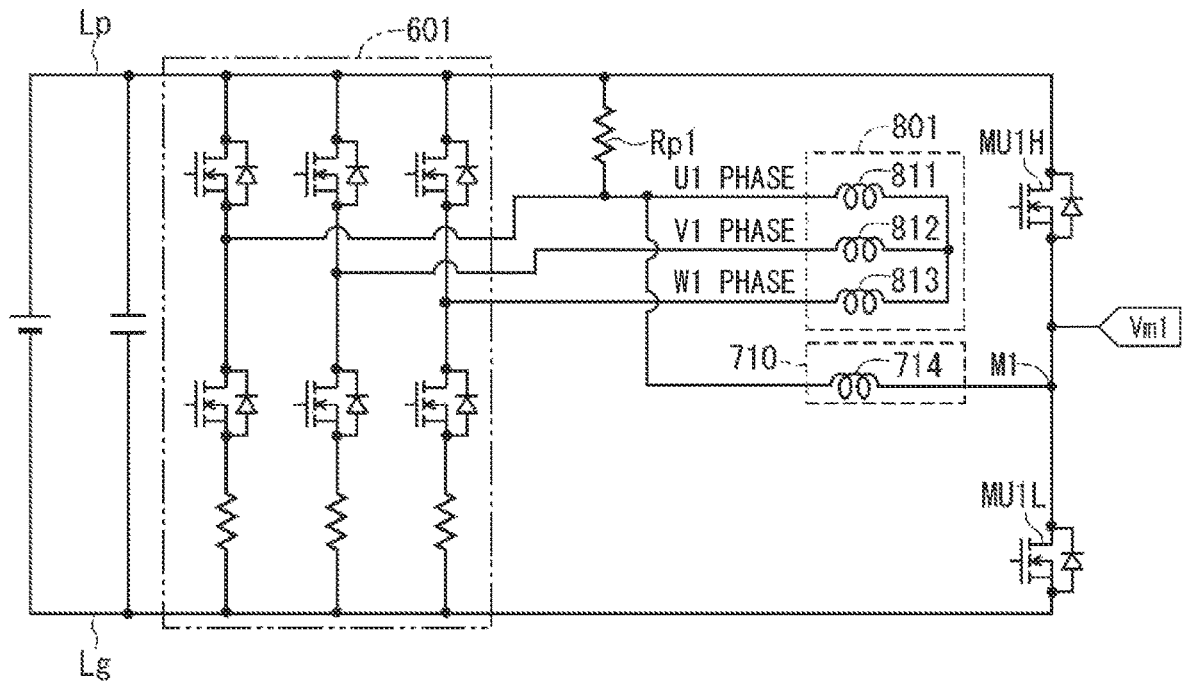
FIG. 15A is a diagram showing an example of arrangement of a pull-up resistor in a configuration in which one DC motor is arranged.
Figure 15B:
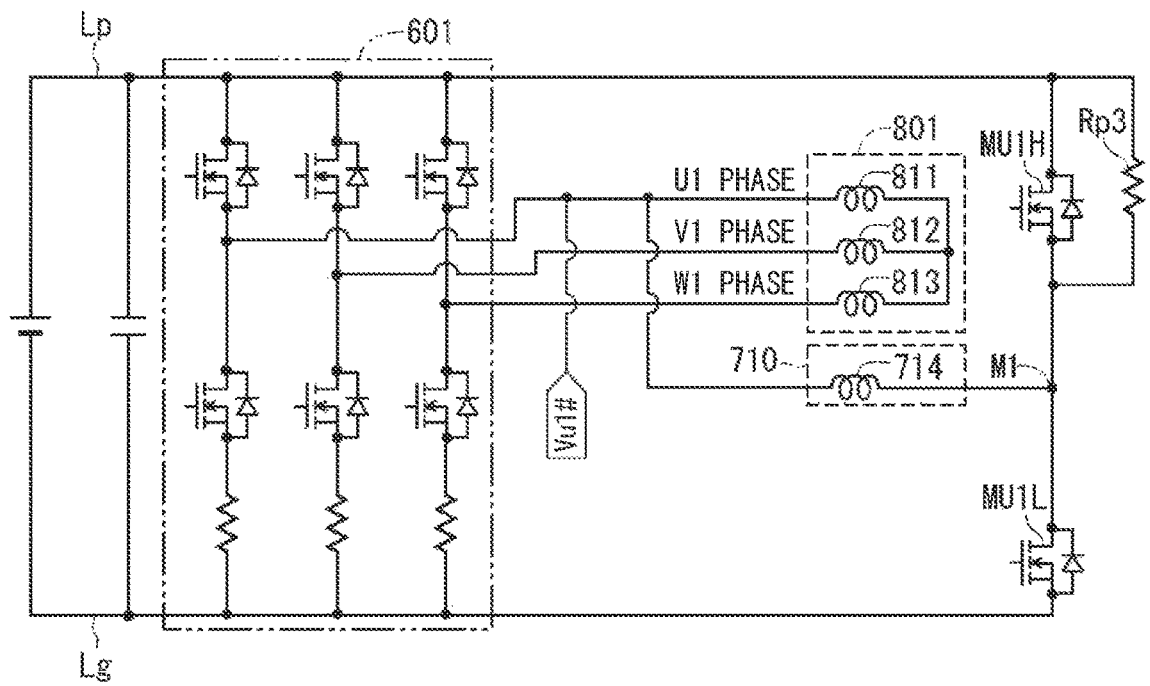
FIG. 15B is a diagram showing an example of arrangement of a pull-up resistor in a configuration in which one DC motor is arranged.

Next, an example of arranging the pull-up resistor will be described with reference to FIGS. 13A to 15B. FIGS. 13A and 13B show a configuration in which two DC motors 710 and 720 are connected to in-phase (for example, U1 phase) windings of a three-phase motor 800. FIGS. 14A and 14B show a configuration in which two DC motors 710 and 720 are connected to windings of different phases (for example, U1 phase and V1 phase) of the three-phase motor 800. FIGS. 15A and 15B show a configuration in which one DC motor 710 is connected to one phase (for example, U1 phase) winding of a three-phase motor 800.

FIGS. 13A, 14A, and 15A show an arrangement example in which the pull-up resistor Rp1 is connected between the winding of one phase (for example, U1 phase) of the three-phase motor 800 and the high potential line Lp. In this case, the anomaly detection unit detects the voltage Vm1 of the first DC motor terminal M1 on the opposite side of the pull-up resistor Rp1 with respect to the first DC motor 710. In addition, in the configurations of FIGS. 13A and 14A, the second DC motor terminal voltage Vm2 is detected.

FIGS. 13B, 14B, and 15B show an arrangement example in which a pull-up resistor Rp3 is connected between the DC motor terminal M1 and the high potential line Lp. In this case, the anomaly detection unit detects the terminal voltage Vu1 #of the winding of one phase (for example, U1 phase) of the three-phase motor 800, which is on the opposite side of the pull-up resistor Rp1 with respect to the first DC motor 710. In addition, in the configurations of FIGS. 13B and 14B, the second DC motor terminal voltage Vm2 is detected.

[Anomaly Detection Configuration]

Next, the configuration of the anomaly detection unit will be described with reference to FIG. 16. In this embodiment, the microcomputer 40 and the ASIC 50 function as an "anomaly detection unit". In the drawings and in the following specification, "BLM (brushless motor)" means a three-phase motor 800, and "DCM (DC motor)" means direct current motors 710 and 720. Further, "BLM relay" and "DCM relay" mean the three-phase motor relays MmU1, MMV1, MmW1 and the DC motor relays MU1r and MU1R shown in FIG. 21. The BLM relays and DCM relays are provided as options according to needs, so they are described in parentheses.

Each circuit in the ASIC 50 will be described in order. The ASIC 50 has a microcomputer power supply 45, a microcomputer monitoring circuit 51, a communication circuit 53, and a pre-driver 54 as parts electrically connected to the microcomputer 40. The microcomputer monitoring circuit 51 checks for anomaly in the microcomputer 40 by using a watchdog ("WD" in the drawings), task response, and the like. The communication circuit 53 receives a cutoff request, a latch request, and the like from the microcomputer 40. The microcomputer 40 receives a microcomputer monitoring result, a pre-charge check result, a pre-driver check result, an overcurrent monitoring result, a terminal voltage, a task of a task response, and the like from the communication circuit 53. When the terminal voltage is AD-converted and detected, the microcomputer 40 may not receive the terminal voltage.

The pre-driver 54 is provided in the power supply relay, the reverse connection protection relay, the BLM drive circuit, the DCM drive circuit, (the BLM relay), and (the DCM relay), respectively. An enable signal ("ENB" in the drawing) and a port output to each pre-driver are communicated between each pre-driver 54 and the microcomputer 40. Further, the pre-driver 54 outputs a drive signal to each switching element ("SW element" in the drawings). The pre-driver check 542 checks for an anomaly in the pre-driver 54.

The pre-charge circuit 52 pre-charges the capacitor C1 at the time of activation, and raises the input voltage Vr1 after the relay. The pre-charge check 542 checks for an anomaly in the pre-charge circuit 52.

The overcurrent monitoring circuit 55 monitors the overcurrent. The terminal voltage monitoring circuit 56 monitors each terminal voltage by the circuit shown in FIG. 12B. The post-latch voltage generated by the latch circuits 410 and 420 of FIGS. 9 and 10 is input to each circuit of the ASIC 50. Further, the ASIC 50 outputs a latch signal to the latch circuit 420 of the configuration example 2 shown in FIG. 9.

[Sequence]

Figure 17:
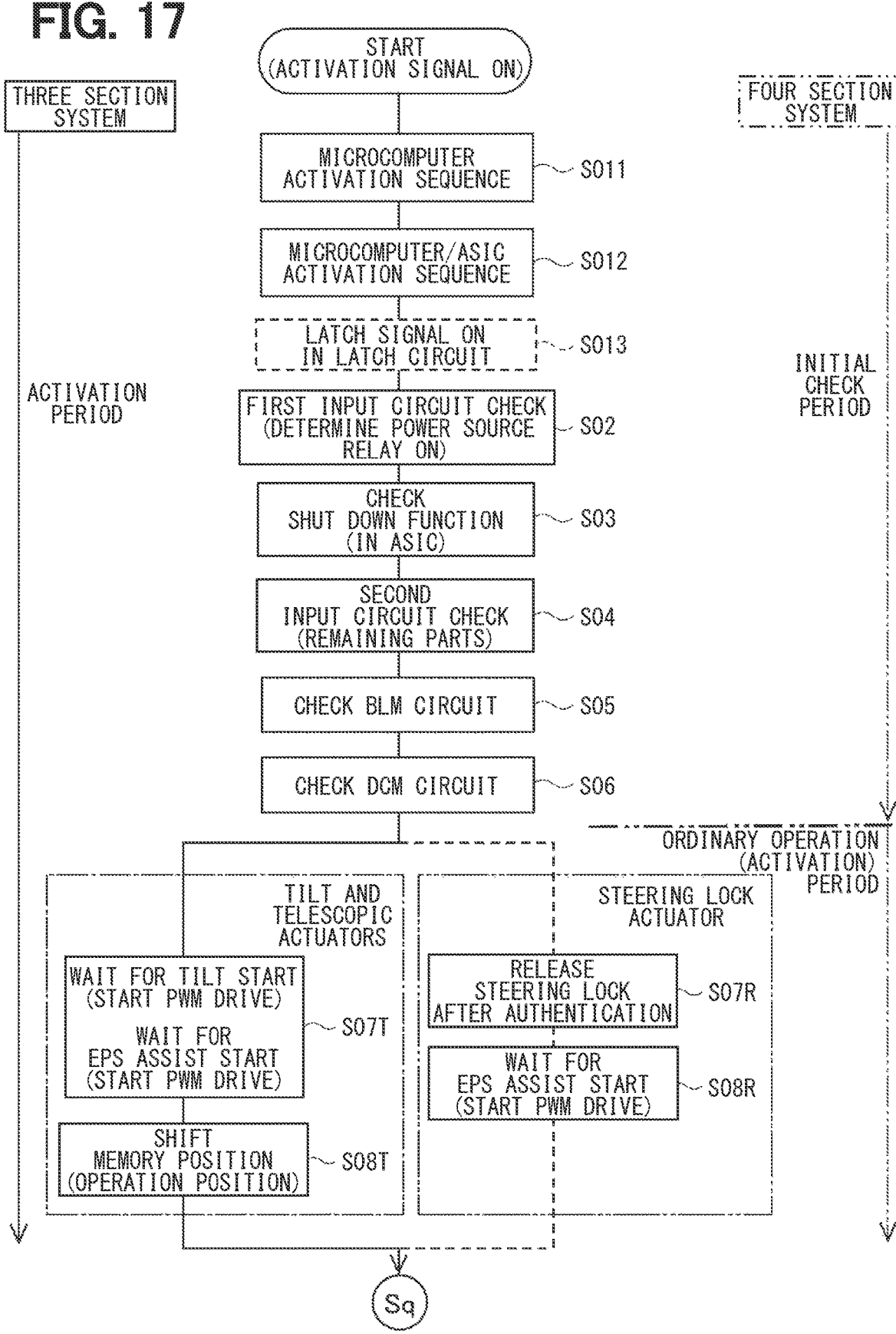
FIG. 17 is a flowchart (1) showing the entire sequence.
Figure 18:
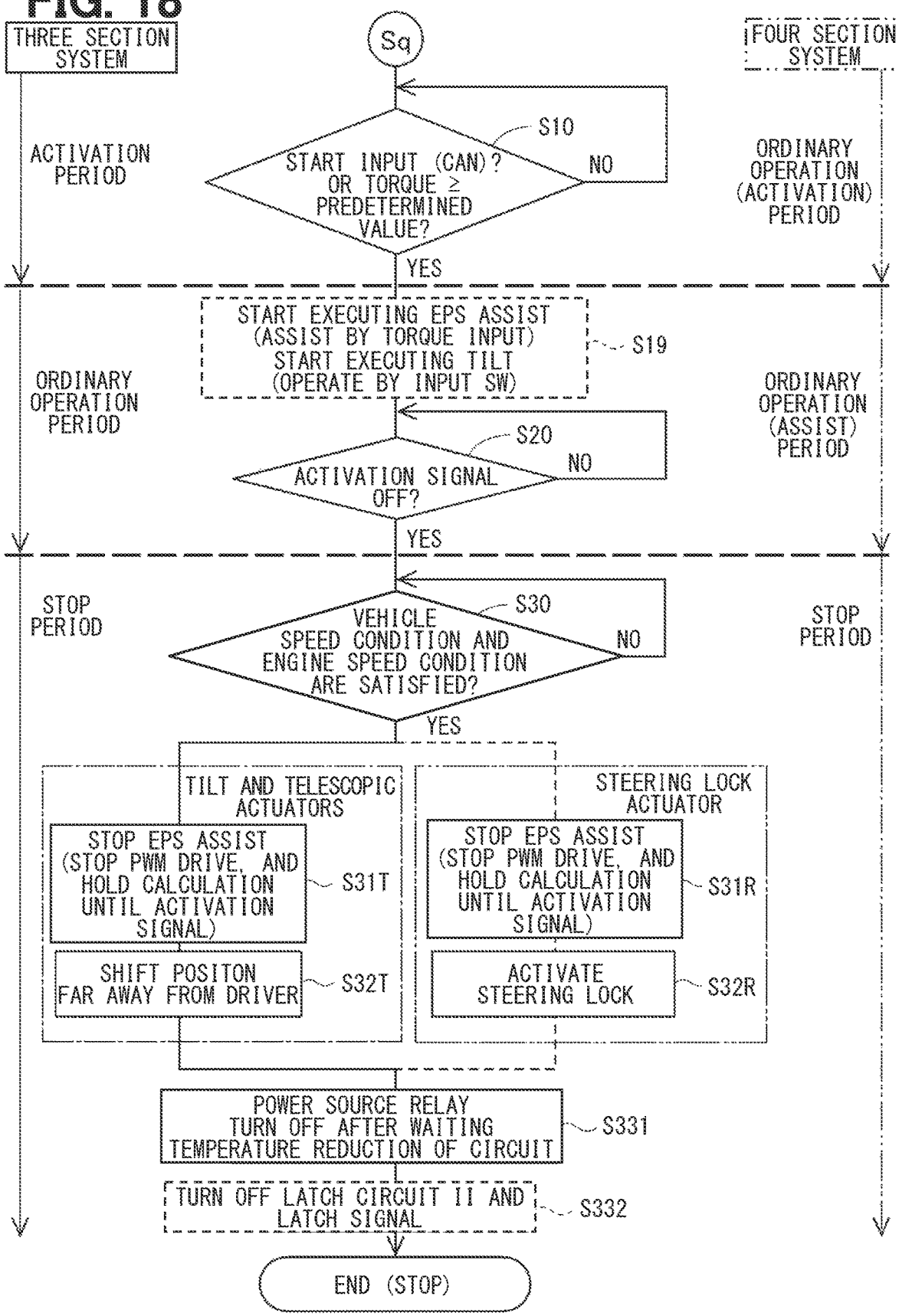
FIG. 18 is a flowchart (2) showing the entire sequence.

Next, with reference to FIGS. 17 to 20, an example of the entire sequence and the detailed sequence related to the anomaly check will be described. The entire sequence shown in FIGS. 17 and 18 is divided into three or four periods. As shown on the left side of the drawings, the three section system is divided into an "activation period", a "ordinary operation period", and a "stop period". As shown on the right side of the drawings, in the four section system, the "activation period" of the three section system is divided into the "initial check period" up to S06 and "ordinary operation (activation) period" after the PWW drive is started in S07T or S07R. Further, in the four section system, the "ordinary operation period" of the three section system is paraphrased as the "ordinary operation (assist) period", and the "ordinary operation (activation) period" and the "ordinary operation (assist) period" are combined as the "ordinary operation period".

A part of the sequence is divided into the case where the DC motor is a tilt actuator and a telescopic actuator and the case where the DC motor is a steering lock actuator. Further, the latch circuits 410 and 420 of the configurations 1 and 2 shown in FIGS. 9 and 10 are referred to as "latch circuit I" and "latch circuit II", respectively. Hereinafter, the symbol "S" indicates a step. In the description of the sequence, the description of the symbol of each element is omitted as appropriate.

Figure 19:
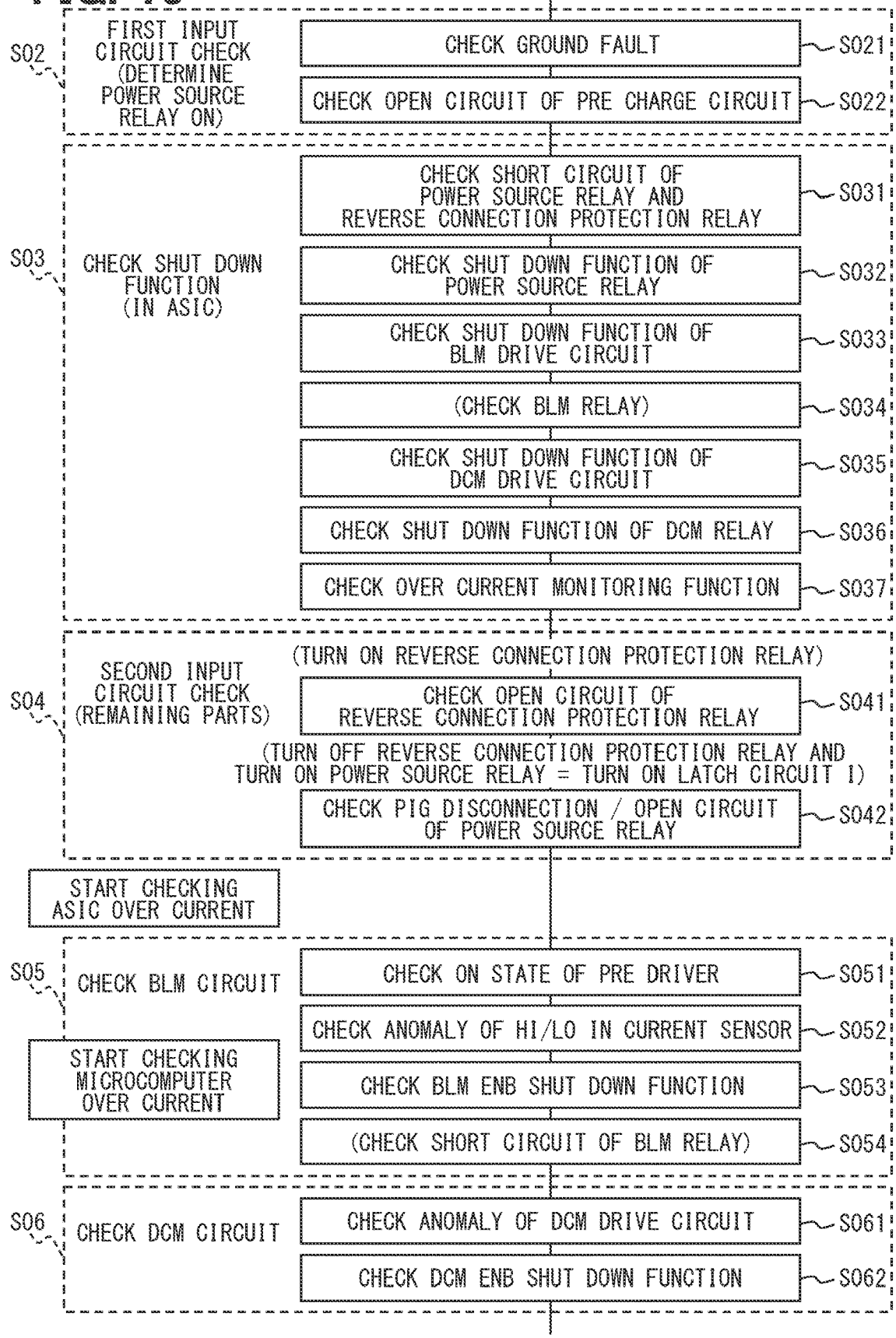
FIG. 19 is a flowchart showing a detailed sequence of anomaly checking.

First, FIGS. 17 and 18 are described. The whole sequence starts when an activation signal such as an IG signal or a wakeup signal is turned on. In S011, the microcomputer activation sequence is executed, and in S012, the microcomputer/ASIC activation sequence is executed. In S013, the latch signal of the latch circuit II is turned on, and the self-holding state starts. In S02, as an input circuit check (1), it is confirmed whether the power relay is turned on. In S03, the cut-off function of the ASIC is checked. In S04, as the input circuit check (2), the remaining checks related to the input circuit are performed. As shown in FIG. 19, the power relay is turned on in the middle of S04, and the self-holding state of the latch circuit I starts. A BLM circuit check is performed in S05, and a DCM circuit check is performed in S06.

When the DC motor is a tilt actuator and a telescopic actuator, the control unit starts the PWM drive of the EPS and the tilt actuator at S07T. The EPS starts assistance when there is a steering torque input while waiting for the start of assistance. Then, the control unit starts tilting when there is an input switch operation. In S08T, the tilt and telescopic actuators move the steering wheel to a memory position (i.e., a driving position). When there is an input switch operation, the control unit stops the operation to the memory position and operates according to the switch operation.

When the DC motor is a steering lock actuator, in S07R, the steering lock is released after authentication. In S08R, the control unit waits for the start of EPS assist while starting the PWM drive, and starts EPS assist by inputting the steering torque.

In S10, it is determined whether there is a start input from CAN or whether the torque input is equal to or higher than a predetermined value, and when YES in S10, the operation proceeds to ordinary operation. It should be noted that the ordinary operation may be started when the assist start is waited without waiting for the start input from CAN. During the ordinary operation period, in S19, the control unit starts EPS assist by inputting the steering torque. In addition, the control unit starts tilting by operating the input switch.

In S20, when the activation signal is turned off, the IG is turned off, or the stop signal is received, it moves to the stop period. In S30 of the stop period, it is determined whether, for example, the following conditions are satisfied for the vehicle speed condition and the engine speed. (A) The state where the vehicle speed is 0 [km/Hr] continues, (b) the state where both the engine speed and the vehicle speed are interrupted continues, and (c) the vehicle speed is 0 [km/Hr] and the engine speed is 0 [rpm], and the like. When "YES" is determined in S30, the process proceeds to S31T or S31R.

When the DC motor is a tilt actuator and a telescopic actuator, the control unit stops the EPS assist at S31T. At this time, the control unit sets the current command for energizing the steering assist actuator 800 to be zero. The PWM drive may be stopped for the legs other than the common leg, and the operation standby mode is performed. That is, it is in a state of waiting for the activation signal to be turned on, the IG to be turned on, or the ECU or the motor to cool down. At S32T, the tilt and telescopic actuators move the steering wheel away from the driver.

When the DC motor is a steering lock actuator, the control unit stops the EPS assist at S31R. At this time, the control unit sets the current command for energizing the steering assist actuator 800 to be zero. The PWM drive may be stopped for the legs other than the common leg, and the operation standby mode is performed. That is, it is in a state of waiting for the activation signal to be turned on, the IG to be turned on, or the ECU or the motor to cool down. In S32R, the steering lock actuator is enabled. In S32R, the steering lock actuator may be enabled after waiting for the key to leave the vehicle or for the door to be unlocked or opened.

After that, in S331, the control unit waits for the temperature of the circuit to drop, if necessary, and then turns off the power relay. In S332, the latch signal of the latch circuit II is turned off, and the self-holding state is released. In this way, the operation of the ECU is stopped. This completes the entire sequence. As shown in control examples 1 to 4 described later, the "switching of treatment according to an anomaly" according to the present embodiment may not be limited to this sequence, and may be carried out based on an appropriately arranged sequence.

Next, with reference to FIGS. 19 and 20, a detailed sequence from the input circuit check (1) in S02 to the DCM circuit check in S06, normal conditions for each check item, and countermeasures in case of anomaly will be described. When the BLM circuit has a two-system configuration, the same processing is performed for each system for the check items included in each system. For example, in the drive circuit of FIG. 7, since the DCM circuit is provided only in the first system, the processing related to the DCM circuit is not performed in the second system. S034 and S054 are carried out only when the BLM relay is provided.

In FIG. 20, the normal condition "pre-driver check" is abbreviated as "PDC". Further, the "threshold value" may be appropriately set for each parameter. Anomaly treatment is performed when the normal conditions are not met multiple times. In action A, the power relay, the BLM drive circuit, and the DCM drive circuit are all turned off. In action B, the DCM drive circuit is turned off. In the case of the action A, the check ends there. In the case of the action B, the process proceeds to the next check, and when all the checks are completed without the action A, the circuit is operated in the action B. Basically, the action B is performed only for DCM-related anomaly, and the action A is performed for other anomaly. In the following description, the description of the action A will be omitted, and only the case of the action B will be described.

The input circuit check (1) of S02 includes steps S021 and S022. In S021, a ground fault check is performed, and the voltage Vpig of the PIG line, which is the energization path from the power supply to the power supply relay, is determined to be normal when "Vpig<threshold value". In S022, an open check of the pre-charge circuit is performed, and when "pre-charge result=normal", it is determined to be normal.

The cut off function check of S03 includes steps S031 to S037. In S031, a short-circuit check of the power supply relay and the reverse connection protection relay is performed, and when "Vint>threshold value" with respect to the Vint including the inter-relay voltages Vint1 and Vint2 of each system, it is determined to be normal. In S032, the power relay cutoff function check is performed, and it is determined to be normal when "cutoff request on, port output on, and Vint<threshold value". In S033, the BLM drive circuit cutoff function check is performed, and it is determined to be normal when "cutoff request on, port output on, and PDC=Lo". In S034, the BLM relay check is performed, and it is determined to be normal when "cutoff request on, port output on, and PDC=Lo".

In S035, the DCM drive circuit cutoff function check is performed, and it is determined to be normal when "cutoff request on, port output on, and PDC=Lo". In the event of an anomaly, the action B is performed. In S036, the DCM relay cutoff function check is performed, and it is determined to be normal when "cutoff request on, port output on, and PDC=Lo". In the event of an anomaly, the action B is performed. In S037, the overcurrent monitoring function check is performed, and when "overcurrent monitoring result=Hi", it is determined to be normal.

The input circuit check (2) of S04 includes steps S041 and S042. After the reverse connection protection relay is turned on, the reverse connection protection relay open check is performed in S041, and when "port output is on, and Vint>threshold value", it is determined to be normal. After S041, the reverse connection protection relay is turned off and the power relay is turned on. Therefore, the self-holding state of the latch circuit I is started. In S042, a check is performed for determining whether the PIG line is broken and whether the power relay is opened, and when "port output is on, and Vint>threshold value", it is determined to be normal.

The BLM circuit check of S05 includes steps S051 to S054. In S051, a pre-driver on check is performed, and when "port output is on, and PDC=Hi", it is determined to be normal. In S052, the current sensor Hi/Lo anomaly check is performed, and when "I current detection value I<threshold value", it is determined to be normal.

In S053, the enable signal shut down function check of the BLM drive circuit is performed, and it is determined to be normal when "ENB (i.e., enabled signal) off, port output on, and PDC=Lo". In S054, a BLM relay short-circuit check is performed, and when "the terminal voltage is within a predetermined range", it is determined to be normal.

The ASIC overcurrent check (that is, overcurrent monitoring by the ASIC) is started from the end of S04 to the beginning of S05. Further, the microcomputer overcurrent check (that is, the overcurrent monitoring by the microcomputer) is started in the middle of S05.

The DCM circuit check of S06 includes steps S061 and S062. In S061, an anomaly check of the DCM drive circuit is performed, and when "the terminal voltage is within a predetermined range", it is determined to be normal. The action A is performed for short-circuit type anomaly, and the action B is performed for open-circuit type anomaly. Specific examples of the DCM drive circuit anomaly check will be described later with reference to FIGS. 22 and 23. In S062, the enable signal shut-down function check of the DCM drive circuit is performed, and when "port output is on, and PDC=Hi", it is determined to be normal. In the event of an anomaly, the action B is performed.

[Specific Example of DCM Drive Circuit Anomaly Check]

Next, a specific example of the DCM drive circuit anomaly check at the activation time and during the ordinary operation will be described with reference to the circuit diagram of FIG. 21 and the flowcharts of FIGS. 22 to 26. The anomaly check at the activation time corresponds to S061 in FIGS. 19 and 20, and the normality of the input circuit, the cutoff function, and the BLM circuit has been confirmed. FIG. 21 shows a simple circuit configuration in which one DC motor 710 is connected to one phase (i.e., U1 phase) of one system of inverter 601. A pull-up resistor Rp is connected between the U1 phase winding 811 and the high potential line Lp, and the DC motor terminal voltage Vm1 is detected.

A motor relay MmU1 is provided in the U1 phase current path on the inverter 601 side of the pull-up resistor Rp. Further, motor relays MMV1 and MmW1 are provided in the current paths of the V1 phase and the W1 phase. The motor relays MmU1, MMV1, and MmW1 of each phase can cut off the current from the three-phase winding set 801 to the inverter 601. By turning off the three-phase motor relays MmU1, MMV1, and MmW1 at the time of the following anomaly detection, it is possible to prevent erroneous detection due to an anomaly on the BLM side.

Further, the DC motor relays MU1r and MU1R capable of cutting off bidirectional current are connected between the branch point Ju of the U1 phase current path and the first terminal T1 of the DC motor 710. Although the description is omitted, by turning off the DC motor relays MU1r and MU1R when an anomaly is detected in the BLM circuit, it is possible to prevent erroneous detection due to an anomaly on the DCM side.

The terminal voltage detection circuit of configuration example 1 shown in FIG. 12A is connected to the DC motor terminal M1 between the high potential side DC motor switch MU1H and the low potential side DC motor switch MU1L. Instead of this, the configuration example 2 shown in FIG. 12B may be used. In the terminal voltage detection circuit, the monitor voltage VDCM1 obtained by multiplying the voltage Vm1 of the DC motor terminal M1 by {Rd/(Ru+Rd)} is AD-converted and detected. In the configuration example 2 shown in FIG. 12B, the flag may be received by communication or the 10 port.

Figure 22:
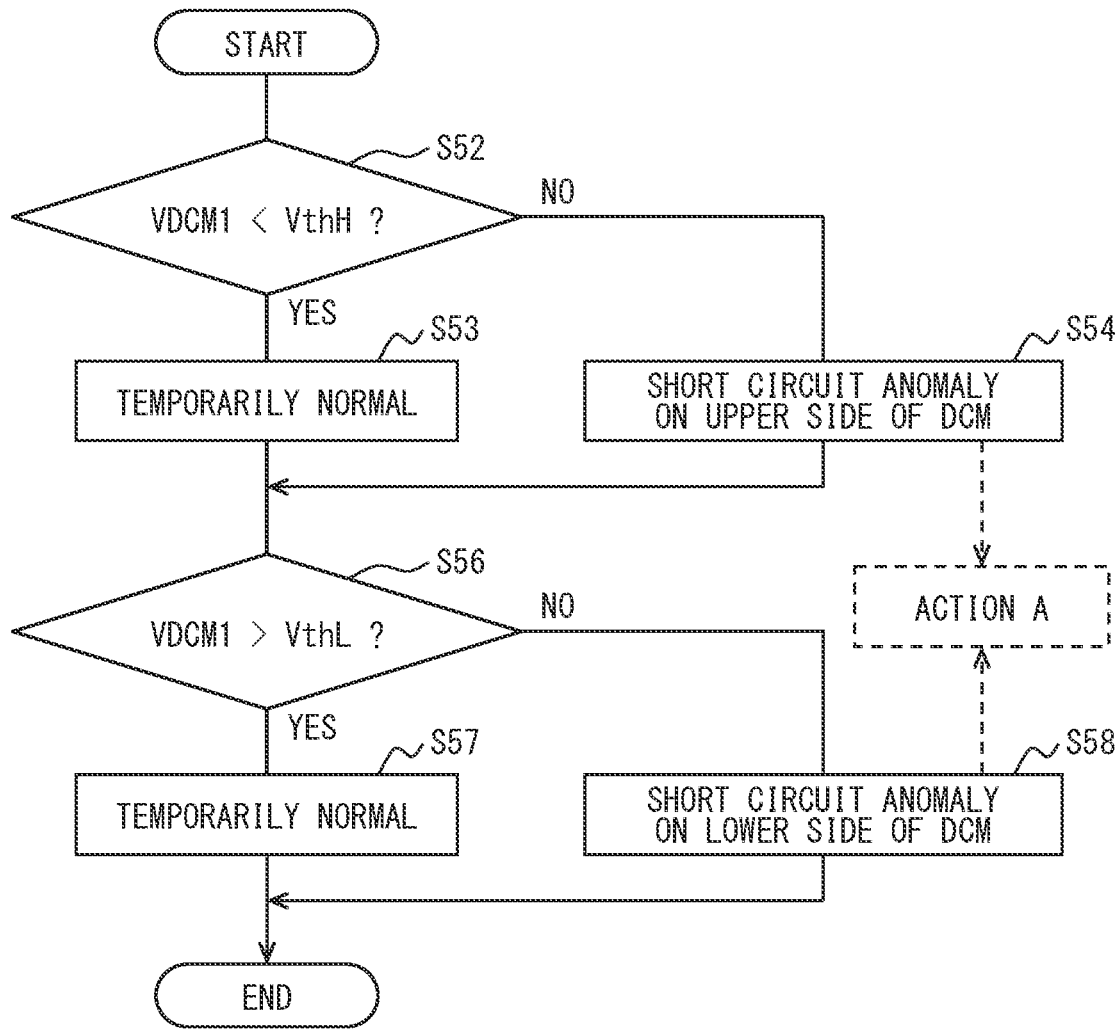
FIG. 22 is a flowchart of anomaly detection of a short circuit in a DCM drive circuit at activation time.
Figure 23:
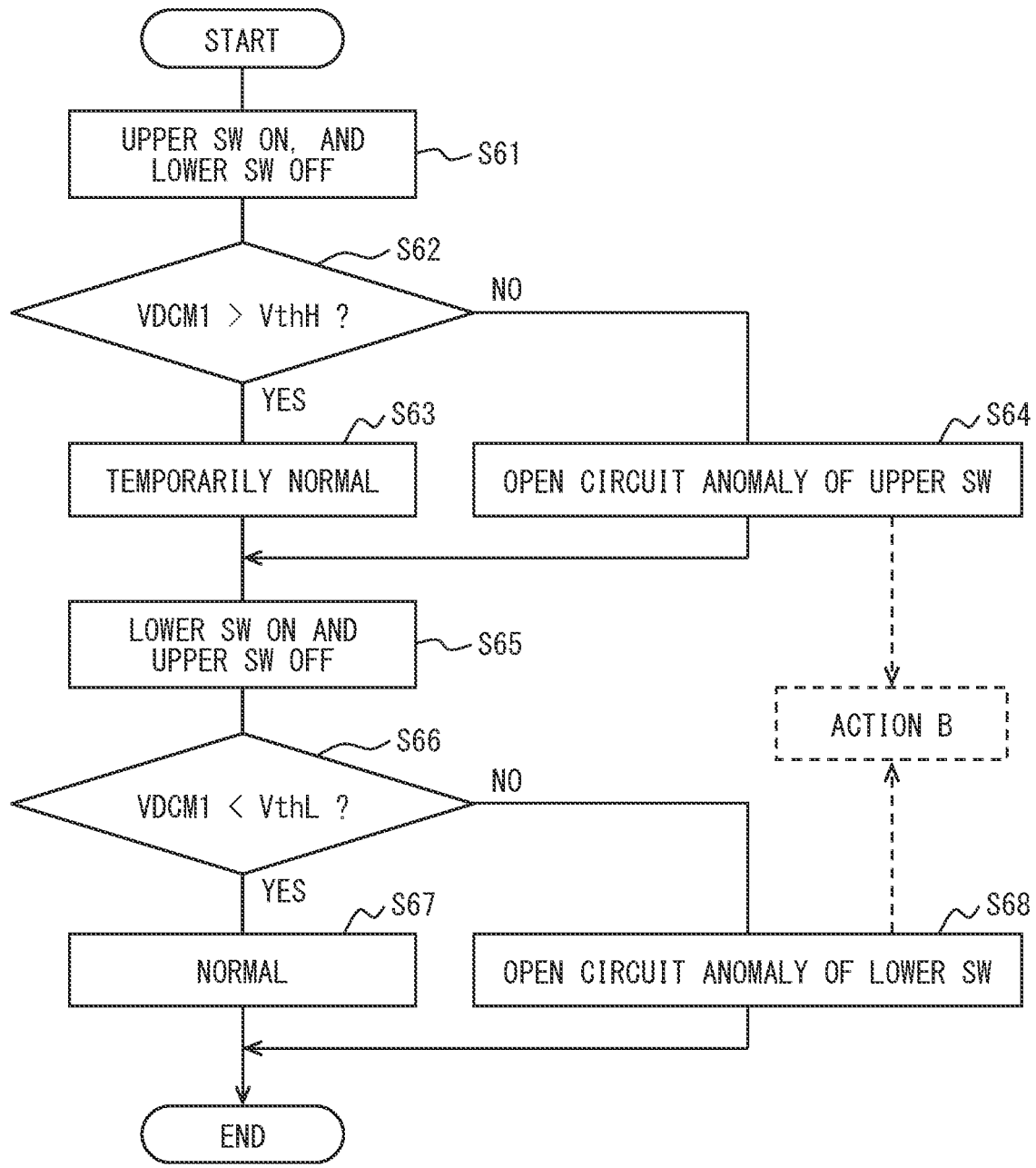
FIG. 23 is a flowchart of anomaly detection of a open circuit in a DCM drive circuit at activation time.

Hereinafter, in the description of the DCM drive circuit anomaly check, the switch MU1H for the high potential side DC motor is simply referred to as "upper switch MU1H", and the switch MU1L for the low potential side DC motor is simply referred to as "lower switch MU1 L". FIGS. 22 and 23 show the detection processing of the short-circuit type anomaly and the open-circuit type anomaly of the DCM drive circuit in the initial check at the time of activation.

In the process of FIG. 22, anomaly detection is performed with the upper switch MU1H and the lower switch MU1L turned off. When the resistance of the DC motor winding 714 is sufficiently smaller than the pull-up resistor Rp, the upper resistor Ru, and the lower resistor Rd, the normal monitor voltage VDCM1 is expressed by the equation (3.1). The monitor voltage VDCM1 when the pull-up resistor Rp or the upper switch MU1H is short-circuited is represented by the equation (3.2). The monitor voltage VDCM1 when the upper resistor Ru is short-circuited is expressed by the equation (3.3). The monitor voltage VDCM1 when the lower switch MU1L or the lower resistor Rd is short-circuited is represented by the equation (3.4).

The values on the right-hand side of equations (3.1), (3.2), and (3.3) are defined as α, β, and γ, respectively. Here, the magnitude relationship of α, β, and γ is 0<α<γ<β<Vr when Ru<Rp. On the other hand, when Rp≤Ru, 0<α<β≤γ<Vr.

$$VDCM1 = Vr \times (Rd)/(Rp+Ru+Rd) = \alpha \quad (3.1)$$

$$VDCM1 = Vr \times (Rd)/(Ru+Rd) = \beta \quad (3.2)$$

$$VDCM1 = Vr \times (Rd)/(Ru+Rd) = \gamma \quad (3.3)$$

$$VDCM1 = 0 \quad (3.4)$$

Further, the monitor voltage VDCM1 at the time of open-circuit of the pull-up resistor Rp, the upper resistor Ru, the DC motor winding 714, the connector, or the like is expressed by the same equation (3.4) as described above. The monitor voltage VDCM1 when the lower resistor Rd is open-circuited is expressed by the equation (3.5).

$$VDCM1 = Vr \quad (3.5)$$

Further, for example, when Rp≤Ru, that is, β≤γ, the high potential threshold value VthH and the low potential threshold value VthL are set in the range of the equations (4.1) and (4.2). For example, when the terminal voltage detection circuit of FIG. 12B is used, the reference voltage Vref_H of the comparator CpH corresponds to the high potential threshold value VthH, and the reference voltage Vref_L of the comparator CpL corresponds to the low potential threshold value VthL.

$$\alpha<VthH<\beta \qquad (4.1)$$

$$0<VthL<\alpha \qquad (4.2)$$

Hereinafter, "temporarily normality" means that no anomaly has been detected in the detection stage up to the present time. In S52, it is determined whether the monitor voltage VDCM1 is lower than the high potential threshold value VthH. When YES in S52, it is determined to be temporarily normal in S53. When NO in S52, it is determined in S54 that the pull-up resistor Rp, the upper switch MU1H, or the upper resistor Ru is short-circuited, or the lower resistor Rd is open-circuited. In S54 of FIG. 22, these anomaly are collectively referred to as "DCM upper side short-circuit type anomaly". In this case, action A is performed.

In S56, it is determined whether the monitor voltage VDCM1 is higher than the low potential threshold value VthL. When YES in S56, it is determined to be temporarily normal in S57. When NO in S56, it is determined in S58 that the lower switch MU1L or the lower resistor Rd is short-circuited, or the pull-up resistor Rp or the upper resistor Ru, the DC motor winding 714, or the connector is open-circuited. In S58 of FIG. 22, these anomaly are collectively referred to as "DCM lower side short-circuit type anomaly". In this case, action A is performed.

Even if it is determined to be temporarily normal in S57 of FIG. 22, it is unknown about the open-circuit anomaly of the upper switch MU1H and the lower switch MU1L. Therefore, next, in the anomaly detection process of FIG. 23, the open-circuit anomaly of the upper switch MU1H and the lower switch MU1L is detected. In S61, the upper switch MU1H is turned on and the lower switch MU1L is turned off. In this state, the normal monitor voltage VDCM1 is expressed by the above equation (3.2). The monitor voltage VDCM1 when the upper switch MU1H is open-circuited is represented by the above equation (3.1). In S62, it is determined whether the monitor voltage VDCM1 is higher than the high potential threshold value VthH. When YES in S62, it is determined to be temporarily normal in S63. When NO in S62, it is determined in S64 that the upper switch MU1H is open-circuit anomaly, and action B is performed.

In S65, the lower switch MU1L is turned on and the upper switch MUHL is turned off. In this state, the normal monitor voltage VDCM1 is expressed by the above equation (3.4). The monitor voltage VDCM1 when the lower switch MU1L is open-circuited is represented by the above equation (3.1). In S66, it is determined whether the monitor voltage VDCM1 is lower than the low potential threshold value VthL. When YES in S66, it is determined in S67 that determinations of the short-circuit type anomaly and the open-circuit type anomaly are determined as normal. When NO in S66, it is determined in S68 that the lower switch MU1L is open-circuit anomaly, and action B is performed. The high potential threshold value VthH of S52 and S62 and the low potential threshold value VthL of S56 and S66 may not be limited to the same value, alternatively, they may be different values in consideration of the influence of hardware variation.

As described above, in the DCM drive circuit of FIG. 21, a pull-up resistor Rp is connected between the U1 phase winding 811 and the high potential line Lp. This pull-up resistor Rp corresponds to Rp1 in FIGS. 13 to 15. Then, the anomaly detection unit detects the DC motor terminal voltage Vm1 and checks the anomaly based on the monitor voltage VDCM1 that correlates with the DC motor terminal voltage Vm1. On the other hand, in the DCM drive circuit in which the pull-up resistor Rp3 shown in FIGS. 13 to 15 is connected between the DC motor terminal M1 and the high potential line Lp, the voltage of the winding of any one phase, for example, the terminal voltage Vu1 #of the U1 phase winding 811 may be detected. That is, in a configuration in which one DC motor 710 is connected to the three-phase winding set 801, there may be four types of pull-up resistor Rp arrangement locations.

FIGS. 24A to 26 show anomaly detection processing of the DCM drive circuit during ordinary operation. Here, the anomaly of each resistor Rp, Ru, Rd, the connector, and the like is omitted, and only the short circuit and the open circuit anomaly of the DC motor winding 714, the upper switch MU1H or the lower switch MU1L are described. Here, an example in which the anomaly detection unit checks for an anomaly based on a value other than the terminal voltage is also shown. The routine of the anomaly detection process during ordinary operation ends when an anomaly is determined, and returns and is repeatedly executed when a ordinary operation is determined.

FIGS> 24A and 24B show two examples of short-circuit anomaly detection based on the current value. In S72A of FIG. 24A, it is determined whether the absolute value |Idc1| of the direct current flowing through the low potential line Lg is larger than the overcurrent threshold value. When YES in S72A, it is determined in S73 that there is a DCM short-circuit type anomaly such as the lower switch MU1L. When NO in S72A, it is determined to be normal in S74.

Figure 24A:
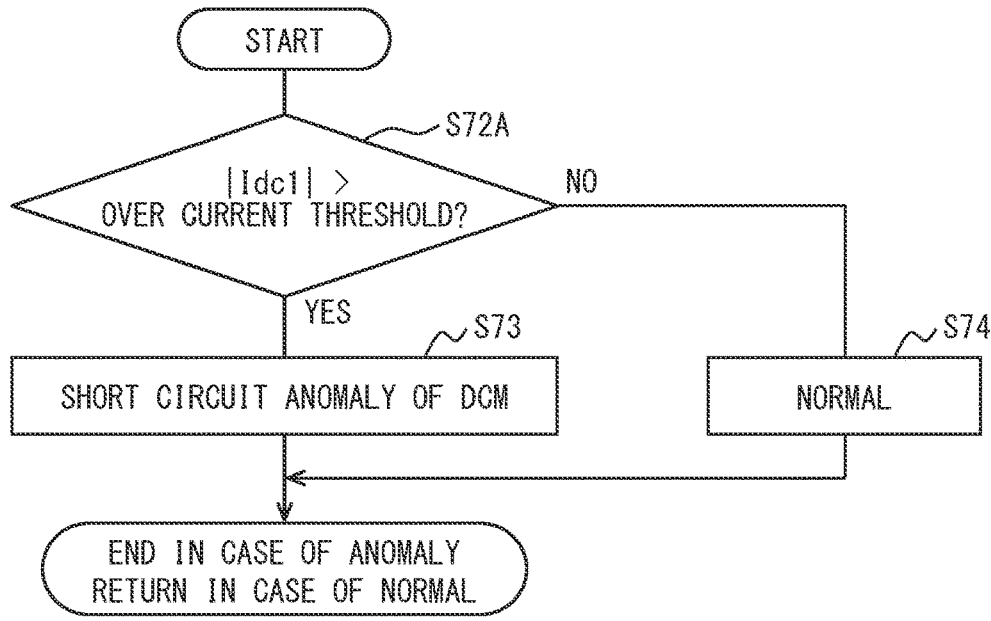
FIG. 24A is a flowchart of anomaly detection of a short circuit in a DCM drive circuit at ordinary operation.
Figure 24B:
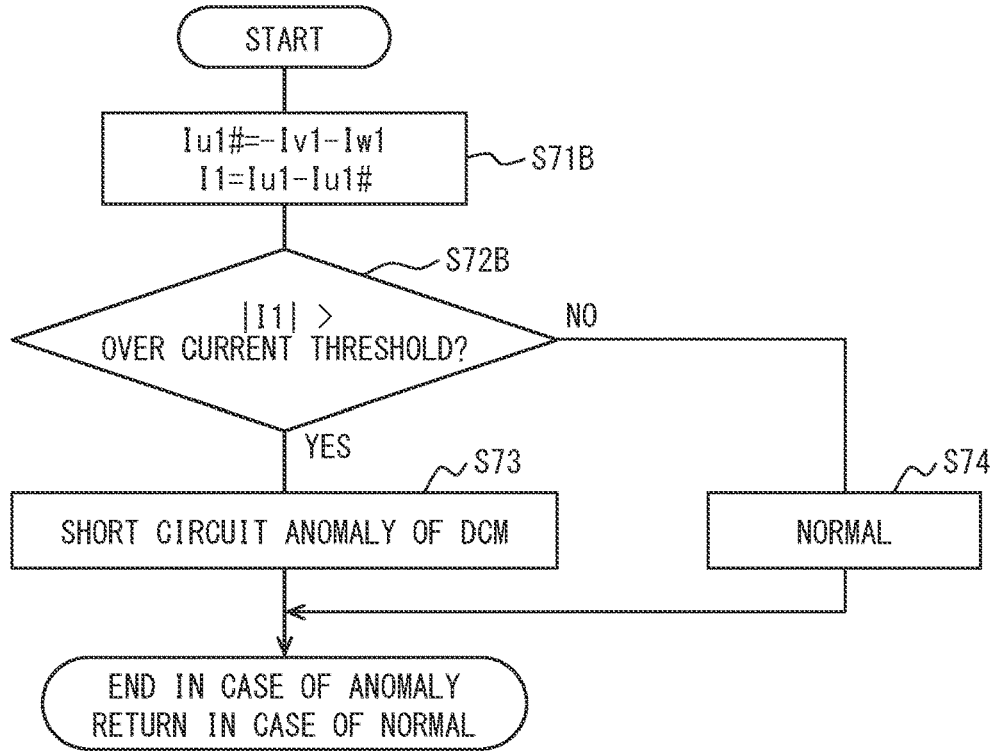
FIG. 24B is a flowchart of anomaly detection of a short circuit in a DCM drive circuit at ordinary operation.

In S71B of FIG. 24B, the motor U1 phase current Iu1 #is calculated from the V1 phase current Iv1 and the W1 phase current Iw1 according to the equation (5.1). Further, according to the equation (5.2), the DC motor current I1 is calculated by subtracting the motor U1 phase current Iu1 from the inverter U1 phase current Iu1.

$$Iu1 \#=-Iv1-Iw1 \qquad (5.1)$$

$$I1=Iu1-Iu1 \# \qquad (5.2)$$

In S72B, it is determined whether the absolute value |I1| of the DC motor current is larger than the overcurrent threshold value. It is the same as FIG. 24A for S73 which shifts in the case of YES in S72B and S74 which shifts in the case of NO in S72B.

Figure 25:
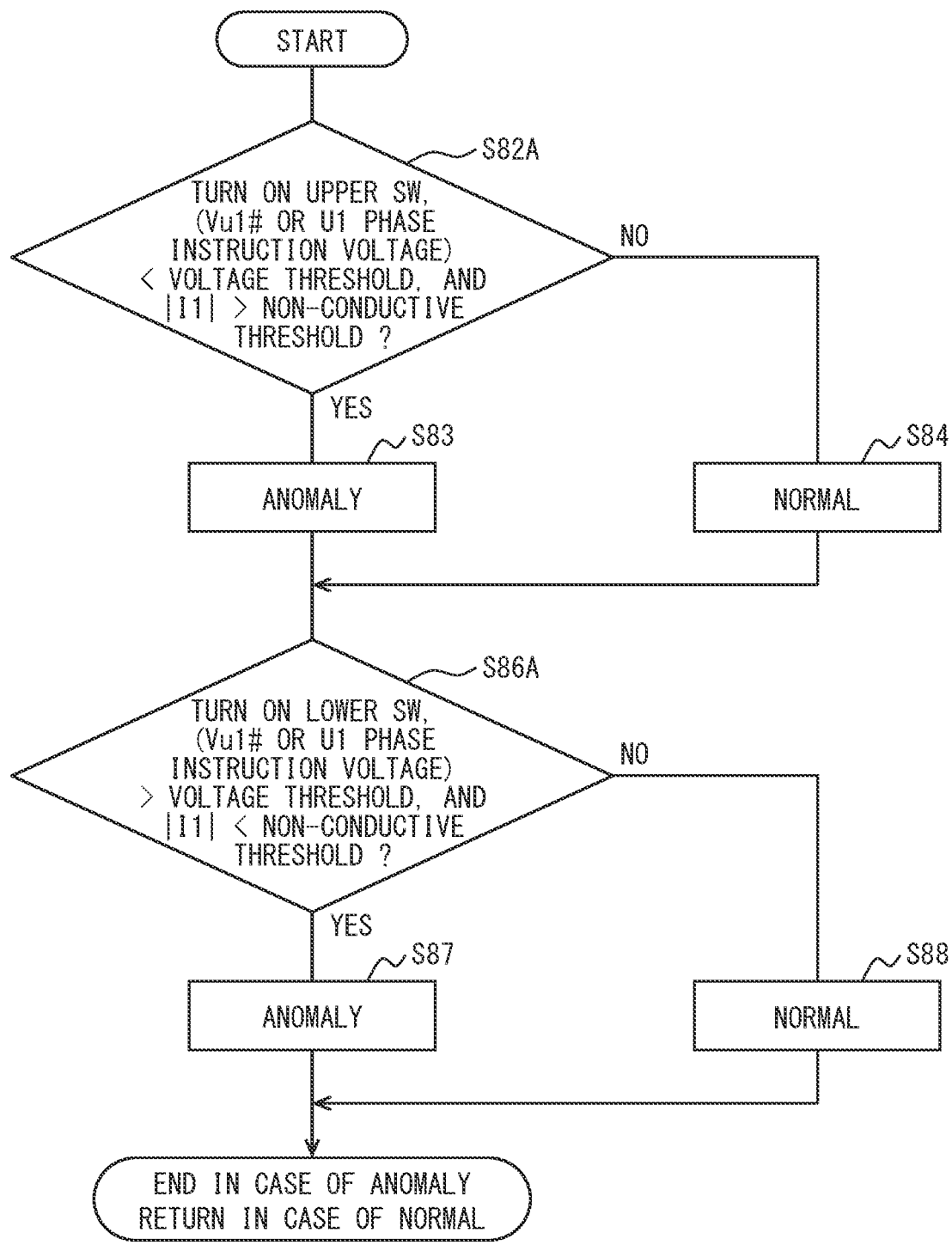
FIG. 25 is a flowchart of anomaly detection of a DCM drive circuit at ordinary operation.
Figure 26:
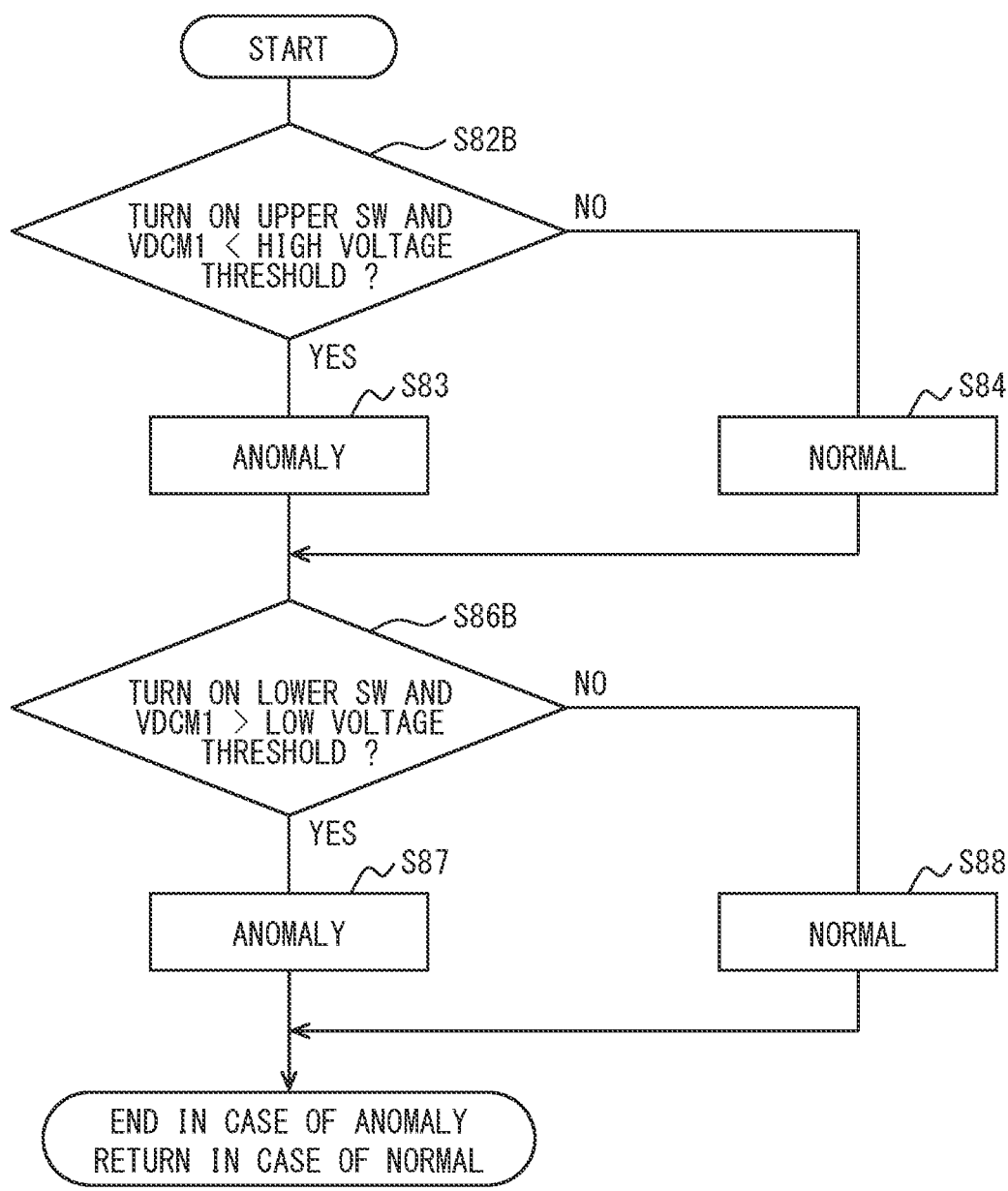
FIG. 26 is a flowchart of anomaly detection of a DCM drive circuit at ordinary operation.

FIGS. 25 and 26 show two examples of anomaly detection when the upper switch MU1H or the lower switch MU1L is turned on. In S82A of FIG. 25, it is determined whether the upper switch MU1H is in the on-state, the U1 phase terminal voltage Vu1 #or the U1 phase command voltage is lower than the voltage threshold value corresponding to the input voltage Vr1, and the absolute value |I1| of the DC motor current is smaller than the non-conducting threshold value. When YES in S82A, it is determined in S83 that the lower switch MU1L is short-circuited, the upper switch MU1H is open-circuited, the DC motor winding 714 is disconnected, and the like. That is, the anomaly is determined when no current is flowing even though the voltage between the terminals at both ends of the DC motor is large. When NO in S82A, it is determined to be temporarily normal in S84.

In S86A, it is determined whether the lower switch MU1L is in the on-state, the U1 phase terminal voltage Vu1 #or the U1 phase command voltage is higher than the voltage threshold value corresponding to the input voltage Vr1, and the absolute value |I1| of the DC motor current is smaller than the non-conducting threshold value. When YES in S86A, it is determined in S87 that the upper switch MU1H is short-circuited, the lower switch MU1L is open-circuited, the DC motor winding 714 is disconnected, and the like. That is, the anomaly is determined when no current is flowing even though the voltage between the terminals at both ends of the DC motor is large. When NO in S86A, it is determined to be normal in S88.

In FIG. 26, S82A and S86A in FIG. 25 are replaced with S82B and S86B. In S82B of FIG. 26, it is determined whether the upper switch MU1 H is on and the monitor voltage VDCM1 is lower than the high voltage threshold value. In S86B, it is determined whether the lower switch MU1 L is on and the monitor voltage VDCM1 is higher than the low voltage threshold value. Here, in FIG. 26, the disconnection anomaly of the DC motor winding 714 cannot be detected. The lower limit threshold value and the upper limit threshold value are set according to the variation range of the voltage drop due to the on-state resistance of the upper/lower switch MU1H/L. The voltage threshold value of S82A, the high voltage threshold value of 82B, the voltage threshold value of S86A, and the low voltage threshold value of S86B may not be limited to the same value, alternatively, they may be different values in consideration of hardware variation.

Control Example of this Embodiment

With reference to FIGS. 27 to 30, "a control example of the present embodiment in which the action is switched by changing the switching operation according to an anomaly" will be described. Control examples based on sequences other than the sequences shown in FIGS. 17 and 18 are also included. The microcomputer 40 and the ASIC 50 as the "anomaly detection unit" check for anomaly in the inverters 601 and 602 or the three-phase motor 800, or anomaly in the DC motor switches MU1H/L, MU2H/L or the DC motors 710 and 720. The control unit 30 changes the switching operation of the inverter switching elements IU1 H/L, IV1H/L, IW1H/L and the DC motor switches MU1 H/L, MU2H/L according to the detected anomaly. In the explanation of the control example, based on the definition of the ordinary operation period of the four section system of FIGS. 17 and 18, the period before the switching operation such as PWM drive or the assist is started and the current is passed is defined as "before the ordinary operation". The period after the switching operation such as PWM drive is started or the assist is started and the current starts to flow is referred to as "during ordinary operation".

Figure 27:
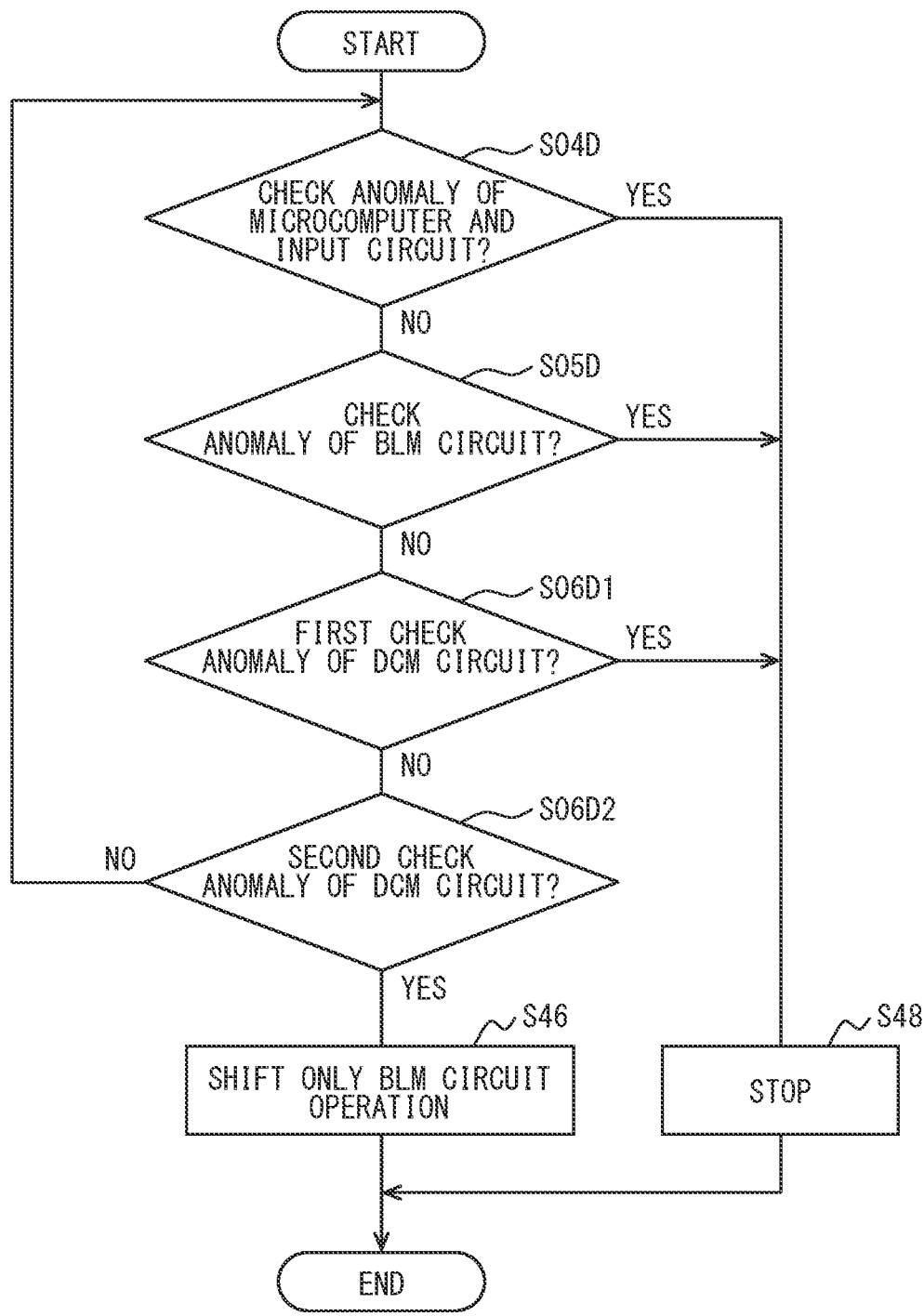
FIG. 27 is a flowchart of a control example 1 according to the present embodiment.

In the control example 1 shown in FIG. 27, the anomaly detection unit checks the anomaly of the microcomputer and the anomaly of the input circuit, and also checks the anomaly of the BLM circuit and the DCM circuit during the ordinary operation of the ECU 10. That is, after starting the ordinary operation, if there is an anomaly in the circuit check, it stops. For the step to make an affirmative determination in the case of an anomaly in the circuit check, "D" is added after the step number. At the start of control example 1, the ordinary operation is started.

In S04D, it is determined whether anomaly occurs by checking the microcomputer and the input circuit (i.e., power relay, reverse connection protection relay, and the like). The microcomputer and input circuit check are checked by the circuit inside the microcomputer and the relay voltage. In S05D, it is determined whether anomaly occurs by the BLM circuit check. The BLM circuit check is determined by the terminal voltage and the detected current. In S06D1, it is determined whether anomaly occurs by the DCM circuit check 1. In S06D2, it is determined whether anomaly occurs by the DCM circuit check 2. The DCM circuit check 1 is a check for short circuit anomaly and the like that may affect the entire drive circuit. The DCM circuit check 2 is a check for an open-circuit type anomaly or the like in which the DCM circuit itself is in anomaly but does not affect others.

When YES in any of S04D, S05D, and S06D1, the control unit 30 stops the operation in S48. The method of stopping will be described later with reference to FIGS. 31 and 32. When YES in S06D2, that is, in the case of an open-circuit type anomaly of the DCM circuit, the control unit 30 shifts to the operation of only the BLM circuit in S46. When it is determined as "NO" in S06D2, that is, when it is not determined to be in an anomaly state by any of the checks, it returns to the front of S04D and the ordinary operation is continued. During the ordinary operation, anomaly checks continue to be performed on a regular basis.

Figure 28:
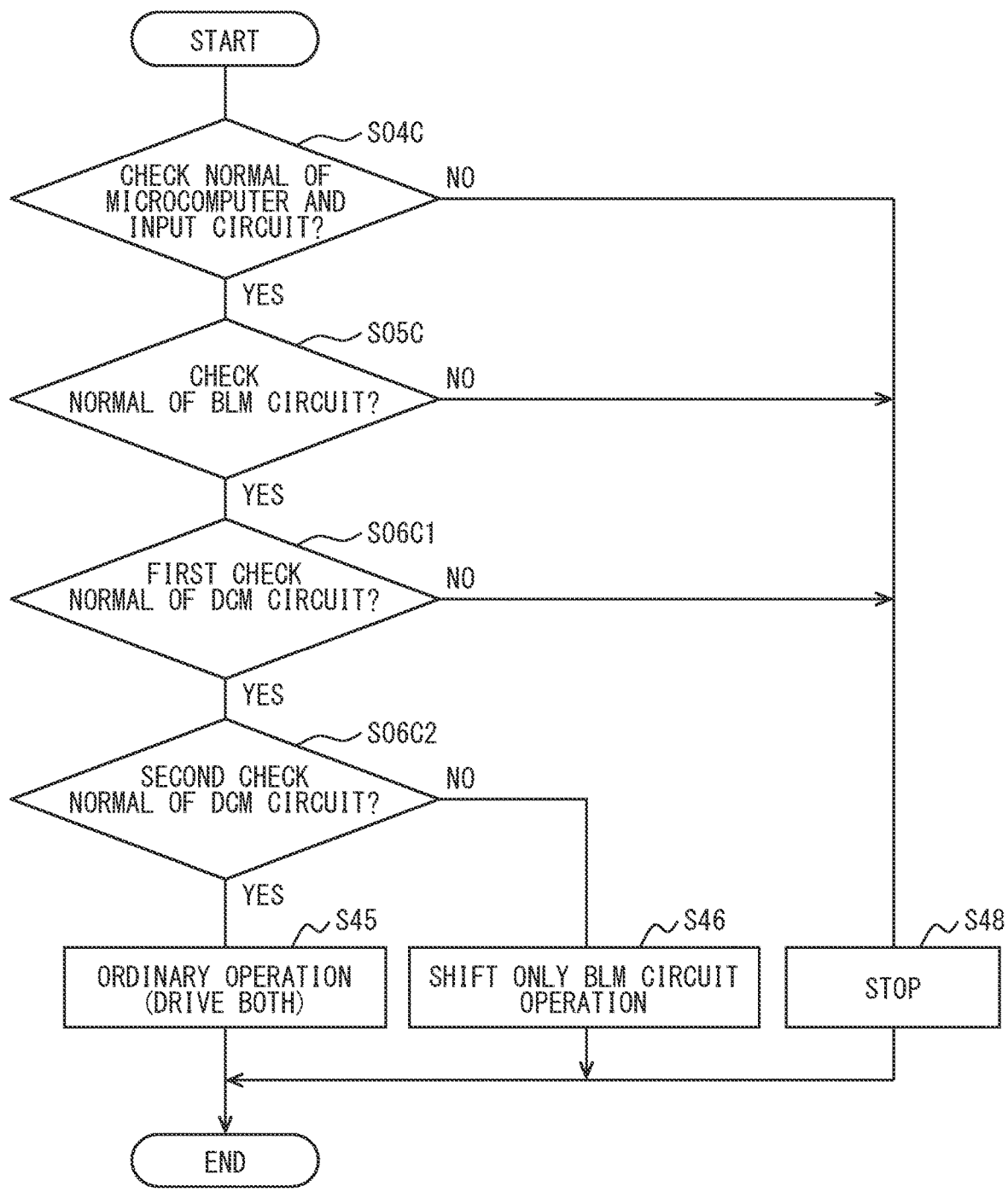
FIG. 28 is a flowchart of a control example 2 according to the present embodiment.

In the control example 2 shown in FIG. 28, the anomaly detection unit checks the anomaly of the microcomputer and the anomaly of the input circuit, and also checks the anomaly of the BLM circuit and the DCM circuit before the ordinary operation of the ECU 10. In other words, after confirming normality with the circuit check after the activation, it shifts to ordinary operation. For the step to make an affirmative determination in the case of an normal in the circuit check, "C" is added after the step number.

In S04C, it is determined whether it is normal or not by the microcomputer and the input circuit check. In S05C, it is determined whether it is normal by the BLM circuit check. In S06C1, it is determined whether it is normal by the DCM circuit check 1. In S06C2, it is determined whether it is normal by the DCM circuit check 2. The meanings of the DCM circuit checks 1 and 2 are based on the control example 1.

When NO in any of S04C, S05C, and S06C1, the control unit 30 stops the operation in S48. When YES in S06C2, that is, when it is determined to be normal in all the checks, the control unit 30 in S45 performs the ordinary operation, that is, drives both the BLM and the DCM. When NO in S06C2, that is, in the case of an open-circuit type anomaly of the DCM circuit, the control unit 30 shifts to the operation of only the BLM circuit in S46. Therefore, at least the EPS assist function can be secured.

In the control example 2, at the first stage of the anomaly check after the ECU 10 is activated, the anomaly detection unit checks the anomaly of the microcomputer 40 that performs the control calculation in the control unit 30 and the anomaly of the input circuit for inputting the electric power from the power supply Bt to the drive circuit of the BLM and the DCM. By checking the circuit common to the drive of each motor at the initial stage, it is possible to efficiently check for anomaly.

Figure 29:
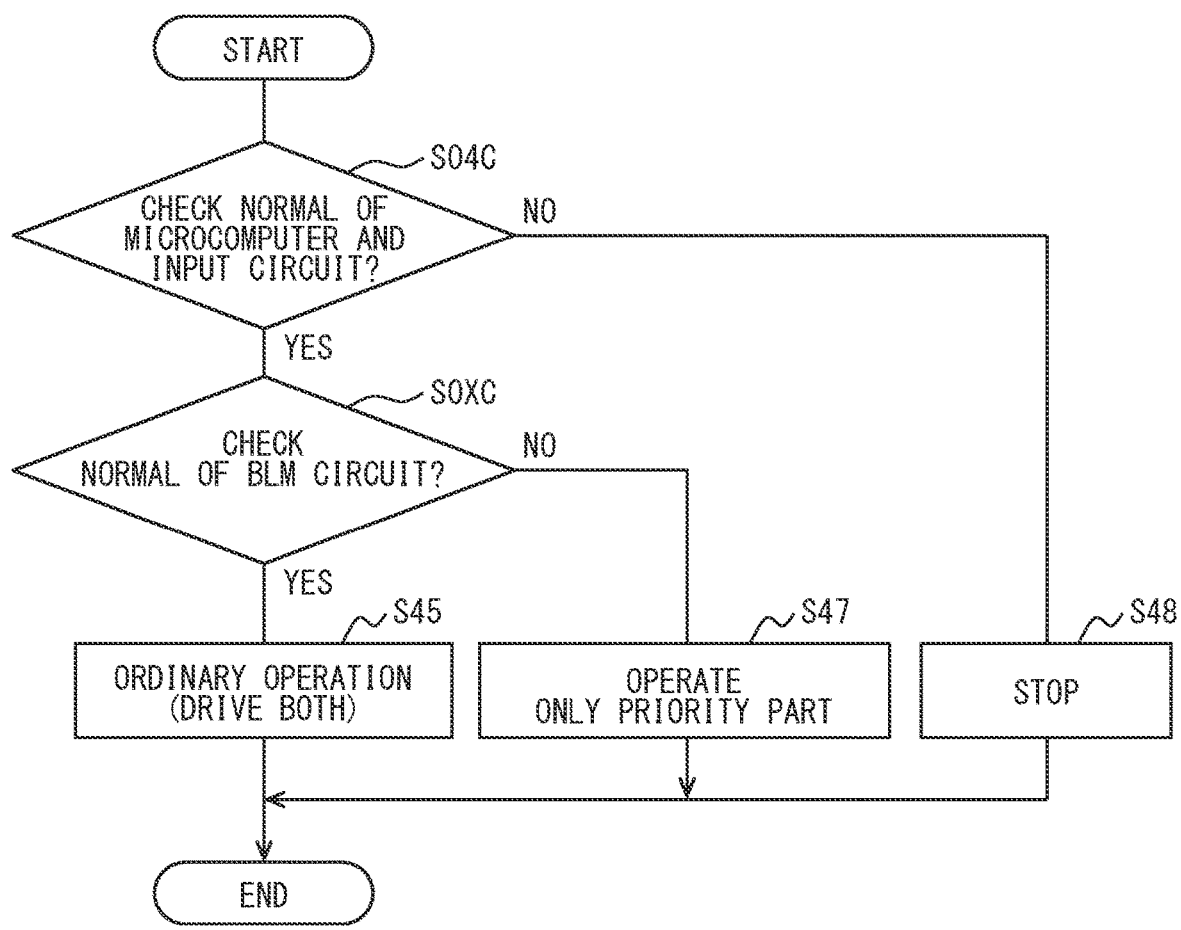
FIG. 29 is a flowchart of a control example 3 according to the present embodiment.

In the control example 3 shown in FIG. 29, the motor among the BLM (that is, the three-phase motor 800) or the DCM (that is, the DC motors 710 and 720) on the priority drive side to be driven preferentially is set in advance. After checking the anomaly of the microcomputer and the input circuit, the control unit 30 checks the drive circuit of the BLM and the DCM, and if there is an anomaly in the drive circuit, the control unit 30 operates only the motor on the priority drive side. S04C and S48 to which the process shifts when the determination in S04C is "NO" are the same as in control example 2.

When "YES" in S04C, it is determined in S06C3 whether it is normal or not by another circuit check, that is, an overall check of the BLM circuit and the DCM circuit. When "YES"

in S06C3, the control unit 30 in S45 drives the ordinary operation, that is, drives both the BLM and the DCM. When "NO" in S06C3, that is, when there is an anomaly in the drive circuit, the control unit 30 operates only the motor on the priority drive side in S47. After that, if an anomaly in the BLM is detected during the operation of the BLM, the control unit 30 stops the BLM.

In the control example 3, instead of the action A at the time of anomaly in FIG. 20, an action that does not turn off the drive circuit of the priority drive side motor is performed. In the control example 3, the motor on the priority drive side can be driven as long as possible even if an anomaly is not identified by the overall check in S06C3 of the BLM circuit and the DCM circuit. For example, by setting the BLM as the priority drive side, the EPS assist function can be realized as much as possible. In the modified example of the control example 3, the BLM may be started to be driven without checking a part or all of the BLM, and the BLM and the DCM may be operated individually to check for anomaly.

Figure 30:
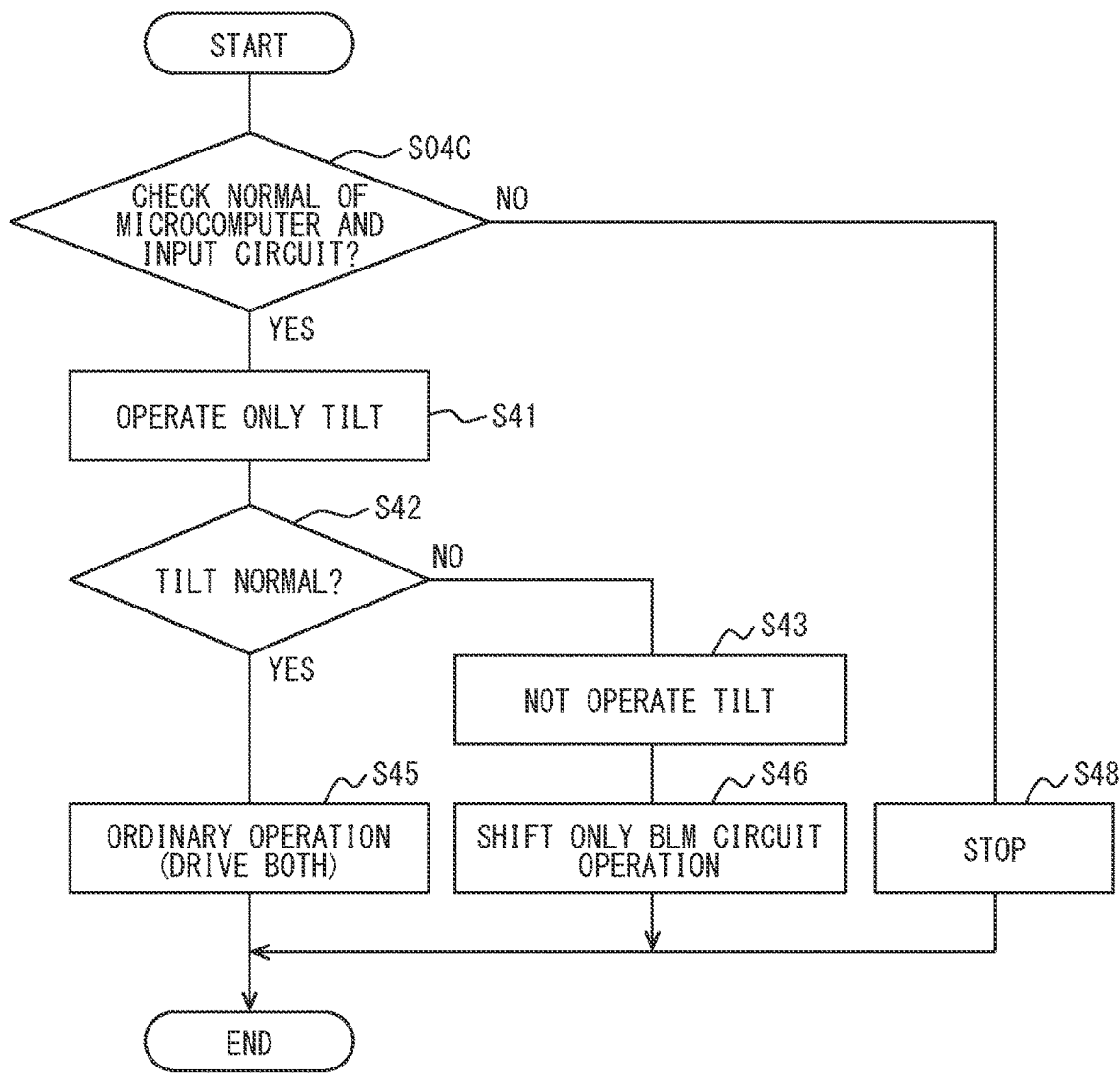
FIG. 30 is a flowchart of a control example 4 according to the present embodiment.

In the control example 4 shown in FIG. 30, the anomaly detection unit checks the anomaly of the microcomputer and the anomaly of the input circuit before the ordinary operation of the ECU 10, and also checks the anomaly of the BLM circuit and the DCM circuit during the ordinary operation of the ECU 10. Further, in the control example 4, the tilt operation is specifically described. S04C and S48 to which the process shifts when the determination in S04C is "NO" are the same as in control examples 2 and 3. When S04C is "YES", the control unit 30 performs only the tilt operation in S41, and determines whether the tilt operation is normal in S42. Specifically, the control unit 30 controls the tilt operation to move to the memory position, or controls the tilt operation to slightly move to the extent that the user does not notice, and checks the operation.

When the tilt operation is normal and "YES" in S42, the process moves to the ordinary operation in S45. After starting the assist by the EPS, the control unit 30 checks the anomaly of the BLM circuit by the anomaly check during the ordinary operation according to the control example 1. When the tilt operation has anomaly and "NO" in S42, the control unit 30 does not perform the tilt operation in S43 and S46, and shifts to the operation of only the BLM circuit.

In the modified example of the control example 4, when "both drive" is started without performing "tilt only operation" and an anomaly is detected by the input switch operation or during the tilt operation for moving to the memory position, the process may proceed to "the BLM circuit only operation". Further, when an anomaly is detected during a period other than during the tilt operation by the input switch operation or for the moving to the memory position, it may be "stopped".

As the main configuration in each control example, the anomaly detection unit detects the voltage of the winding of any one or more phases of the three-phase motor 800 or the voltage of any one or more DC motor terminals, and determines the anomaly based on the detected voltage. This makes it possible to detect various anomalies with a simple configuration.

Further, the anomaly detection unit may detect the voltages Vu1 #, Vv1 #, and Vw1 # of the windings of each phase of the three-phase motor 800. Alternatively, the anomaly detection unit may further detect the voltages Vm1 and Vm2 of the DC motor terminals M1 and M2 corresponding to the DC motors 710 and 720. As a result, it is possible to detect all the anomalies including the case of disconnection of the three-phase winding set, disconnection of the DC motor winding, and the like.

[Switching Actions According to Anomaly]

With reference to FIG. 31, the switching of actions according to an anomaly will be described. When it is determined that the microcomputer check, the input circuit check, the BLM circuit check or the DCM circuit check is determined as the anomaly in each of the above control examples, for example, in the case of control example 1, when an anomaly occurs during ordinary operation, a part or all of the operation is stopped. The anomaly check other than the DCM circuit anomaly check is the same as the anomaly check of a general three-phase inverter.

The method of stopping at the time of anomaly is common to the microcomputer and the input circuit anomaly check, the BLM circuit anomaly check, and the DCM circuit anomaly check. In case of short circuit anomaly, it is stopped by turning off the power relay. That is, when the anomaly detection unit detects an anomaly in which a large current flows, the control unit turns off the power supply relay before the inverter switching element or the DC motor switch. In the case of an open circuit type anomaly, it is stopped by the action of "gradually reducing the current with the inverter and then turning off" or the action of "turning off the inverter immediately and reducing the current with the inverter". The details of the action of "gradually reducing the current with the inverter and then turning it off" will be described later with reference to FIG. 32.

Regarding how to continue the operation at the time of anomaly, in the case of the microcomputer and the input circuit anomaly check, and the case of the BLM circuit anomaly check, both the BLM and the DCM operations are stopped. When the BLM has a two-system configuration and one of the two systems has the anomaly, the normal system may be used for single-system drive. When the DCM circuit check is determined as the anomaly, only the BLM circuit continues to operate.

[How to Stop in the Action at Anomaly]

Figure 32:
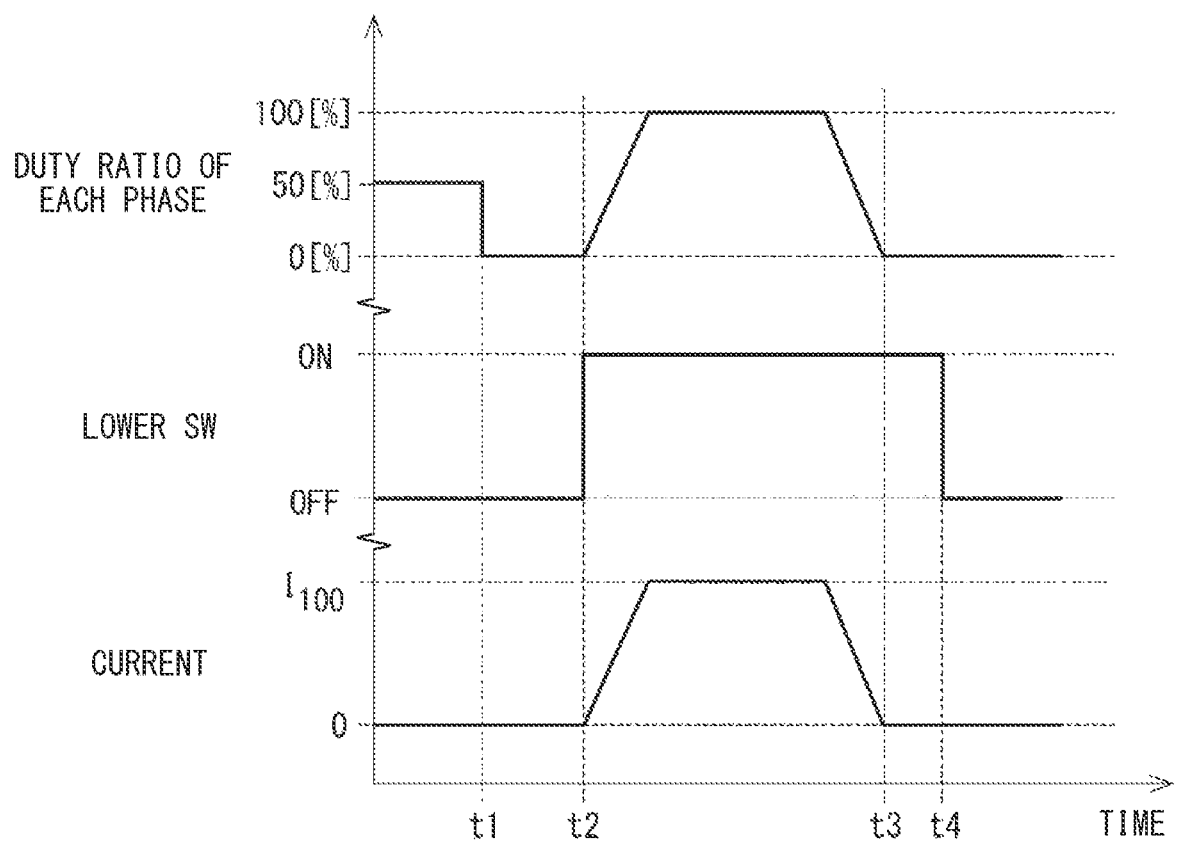
FIG. 32 is a time chart showing a current control when the DC motor stops being energized.

FIG. 32 shows the current control when the DC motors 710 and 720 are stopped. The drive circuit has the configuration shown in FIG. 11 and the like. Since the currents I1 and I2 energized in the DC motors 710 and 720 have smaller absolute values than the phase current flowing in the three-phase motor 800, the DC motor switches MU1 H/L and MU2H/L utilize switches having a smaller current capacity than the inverter switching elements IU1 H/L, IV1H/L and IW1H/L.

Hereinafter, only 710 will be assigned as the symbol of the DC motor. It is assumed that the energization of the DC motor 710 is stopped during the ordinary operation at the normal time, or the energization of the DC motor 710 is stopped due to an anomaly detected during the ordinary operation. If the DC motor switch MU1L on the low potential side is turned off while the phase current is large, the DC motor switch MU1 L may be overloaded.

Therefore, the control unit 30 controls the current as shown in FIG. 32. Each phase duty ratio of the three-phase motor 800 is changed from 50% to 0% at time t1, and then increases from 0% to 100% when the DC motor switch MU1L is turned on at time t2. Then, after the duty ratio of each phase reaches 100%, the state is maintained. At this time, the DC motor current I1 increases from 0 to the maximum value $I_{100}$ with the change of each phase duty ratio, and then it is maintained in that state.

When it is decided to stop the energization of the DC motor 710, the control unit 30 first operates the inverter switching elements IU1H/L, IV1H/L, and IW1H/L to reduce the phase duty ratio. Then, at the time t4 after the time t3 when each phase duty ratio and the DC motor current I1 drop to 0 or a value equal to or less than the allowable value, the control unit 30 turns off the DC motor switch MU1 L. To put it simply, the control unit 30 turns off the DC motor switch MU1 L after reducing the current so that the current on the inverter 601 side gradually decreases. When it is desired to turn off immediately in the event of an anomaly, the inverter switching element is turned off without increasing or decreasing the duty ratio, and the current is reduced by the inverter.

In this way, when the DC motor 710 is stopped, the control unit 30 operates the inverter switching elements IU1 H/L, IV1H/L, and IW1H/L to reduce the voltage on the first terminal T1 side of the DC motor 710, and then, the control unit 30 operate the DC motor switch MU1H/L to stop the energization of the DC motor 710. As a result, a switch having a relatively small current capacity can be used as a DC motor switch MU1H/L while being appropriately protected. In addition, a transistor or a mechanical relay that performs a slow switching operation can be used under a condition that a high-speed switching operation is not performed.

Other Embodiments (A) In the sequence of the above embodiment, the BLM circuit check is first performed and then the DCM circuit check is performed, alternatively, the DCM circuit check may be first performed and then the BLM circuit check may be performed. In addition, the order of the input circuit and the cutoff function check may be appropriately changed according to the circuit configuration and the like.

(B) In the sequence of the above embodiment, both the anomaly of the microcomputer and the anomaly of the input circuit are checked at the initial stage of the anomaly check, alternatively, only one of the anomaly of the microcomputer or the anomaly of the input circuit may be checked.

(C) The latch circuit, the terminal voltage detection circuit, and the like may not be limited to the configuration example of the above embodiment, and may be any one that can realize the same function.

(D) In the system including the two-system three-phase motor 800, the DC motor may not be limited to the configuration in which the DC motor is connected to only one system, alternatively, one or more DC motors may be connected to each one or more phases of the two systems. In that case, the total number and distribution of DC motors connected to each phase of the first system and the second system are determined according to the requirements. The distribution of the DC motors is determined in consideration of a power balance, a heat generation balance, a balance of a use frequency and a use timing, and the like between the systems.

(E) The multiphase rotating machine may not be limited to having three phases, alternatively, it may have two phases or have four or more phases, that is, generalized N phases (N is an integer of 2 or more). The multiphase rotating machine may include three or more multiphase winding sets.

(k) The rotating machine control device of the present disclosure may not be limited to a steering assist motor or a reaction force motor in a steering system of a vehicle, and a steering-position actuator, or a steering lock actuator, alternatively, it may be applied as various rotating machine control devices using a multiphase AC motor and a DC motor in combination. The steering assist motor or the reaction force motor may not be an electromechanical integrated type, alternatively, it may be an electric-mechanical separation type in which the motor body and the ECU are connected by a harness.

The configuration of the present disclosure is more effective in a vehicle motor in which various motors are disposed proximately, and is applicable to combinations of, for example, a motor for a hydraulic pump of a brake and a motor for a parking brake, a plurality of seat motors, a motor for a sliding door or a motor for a wiper, a motor for a side window and a motor for a side view mirror, a motor for an electric water pump and a motor for an electric fan, and the like.

The present disclosure is not limited to such embodiments but can be implemented in various forms without deviating from the spirit of the present disclosure.

In the above embodiment, each of the control unit may be provided separately as one or more than one controller or may be provided integrally as one or more than one controller. Such a controller and method thereof described in the present disclosure may be implemented by one or more than one special-purpose computer. Alternatively, the control circuit described in the present disclosure and the method thereof may be realized by a dedicated computer configured as a processor with one or more dedicated hardware logic circuits. Alternatively, the control unit and the technique according to the present disclosure may be achieved using one or more dedicated computers constituted by a combination of the processor and the memory programmed to execute one or more functions and the processor with one or more hardware logic circuits. Further, the computer program may be stored, as a program product, in a computer-readable non-transitory tangible storage medium as instructions to be executed by a computer.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S011. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A rotating machine control device for driving one or more multi-phase rotating machines including one or more multi-phase winding sets and one or more direct-current rotating machines having one end as a first terminal connected to a phase current path in one or more phases of at least one set of the one or more multi-phase winding sets, the rotating machine control device comprising:
   one or more multi-phase power converters that is connected to a positive electrode and a negative electrode of a power supply via a high potential line and a low potential line, respectively, converts a direct current electric power of the power supply to a multi-phase alternating current electric power according to an operation of a plurality of inverter switching elements bridge-connected to each other, and applies a voltage to each phase winding of the one or more multi-phase winding sets;
   a direct current rotating machine switch that includes a high-potential side switch and a low-potential side switch connected in series to each other via a direct current motor terminal connected to a second terminal which is an other end opposed to the first terminal of the one or more direct-current rotating machines, and sets a voltage of the direct current motor terminal to be variable by switching; and
   a control unit that controls an operation of the plurality of inverter switching elements and the direct current rotating machine switch in a drive circuit for the one or more multi-phase rotating machines and the one or more direct-current rotating machines, wherein:
   the drive circuit includes the one or more multi-phase power converters and the direct current rotating machine switch;
   the control unit includes an anomaly detection unit for detecting an anomaly of the one or more multi-phase power converters or the one or more multi-phase rotating machines, or an anomaly of the direct current rotating machine switch or the one or more direct-current rotating machines; and
   the control unit changes a switching operation of the plurality of inverter switching elements and the direct current rotating machine switch according to the anomaly detected by the anomaly detection unit.

2. The rotating machine control device according to claim 1, wherein:
   after activating the rotating machine control device, the anomaly detection unit checks at least one of or both of an anomaly in a microcomputer that performs a control and a calculation in the control unit, or an anomaly in an input circuit that inputs an electric power from the power supply to the drive circuit of the one or more multi-phase rotating machines and the one or more direct-current rotating machines.

3. The rotating machine control device according to claim 2, wherein:
   one of the one or more multi-phase rotating machines and the one or more direct-current rotating machines is preliminarily determined as a rotating machine on a priority drive side that is driven with priority;
   the anomaly detection unit checks the anomaly in the drive circuit of the one or more multi-phase rotating machines and the one or more direct-current rotating machines after checking the anomaly in the microcomputer and the input circuit; and
   when the drive circuit has the anomaly, the control unit operates only the rotating machine on the priority drive side.

4. The rotating machine control device according to claim 1, wherein:
   the anomaly detection unit checks an anomaly in a microcomputer that performs a control and a calculation in the control unit and an anomaly in an input circuit that inputs an electric power from the power supply to the drive circuit of the one or more multi-phase rotating machines and the one or more direct-current rotating machines before an ordinary operation of the rotating machine control device; and
   the anomaly detection unit checks an anomaly in the drive circuit of the one or more multi-phase rotating machines and the one or more direct-current rotating machines during the ordinary operation of the rotating machine control device.

5. The rotating machine control device according to claim 1, wherein:
   the anomaly detection unit checks an anomaly in a microcomputer that performs a control and a calculation in the control unit and an anomaly in an input circuit that inputs an electric power from the power supply to the drive circuit of the one or more multi-phase rotating machines and the one or more direct-current rotating machines and further checks an anomaly in the drive circuit of the one or more multi-phase rotating machines and the one or more direct-current rotating machines before an ordinary operation of the rotating machine control device.

6. The rotating machine control device according to claim 1, wherein:
   the anomaly detection unit checks an anomaly in a microcomputer that performs a control and a calculation in the control unit and an anomaly in an input circuit that inputs an electric power from the power supply to the drive circuit of the one or more multi-phase rotating machines and the one or more direct-current rotating machines and further checks an anomaly in the drive circuit of the one or more multi-phase rotating machines and the one or more direct-current rotating machines during an ordinary operation of the rotating machine control device.

7. The rotating machine control device according to claim 1, wherein:
   the anomaly detection unit detects a voltage of a winding of the one or more phases of the one or more multi-phase rotating machines or a voltage of one or more direct current motor terminals, and checks an anomaly based on a detected voltage.

8. The rotating machine control device according to claim 7, wherein:
   the anomaly detection unit detects the voltage of the winding of each phase of the one or more multi-phase rotating machines.

9. The rotating machine control device according to claim 7, wherein:

the anomaly detection unit detects the voltage of the one or more direct current motor terminals corresponding to the one or more direct-current rotating machines, respectively.

10. The rotating machine control device according to claim 7, further comprising:
a pull-up resistor connected between a winding of the one or more phases of the one or more multi-phase rotating machines and the high potential line, or between the one or more direct current motor terminals and the high potential line.

11. The rotating machine control device according to claim 10, wherein:
in a configuration in which the pull-up resistor is connected between a winding of the one or more phases of the one or more multi-phase rotating machines and the high potential line, the anomaly detection unit detects the voltage of the one or more direct current motor terminals, or
in a configuration in which the pull-up resistor is connected between the one or more direct current motor terminals and the high potential line, the anomaly detection unit detects the voltage of the winding of the one or more phases of the one or more multi-phase rotating machines.

12. The rotating machine control device according to claim 1, further comprising:
a power supply relay arranged between the power supply and the plurality of inverter switching elements, wherein:
when the anomaly detection unit detects an anomaly in which a large current flows, the control unit turns off the power supply relay before turning off the plurality of inverter switching elements or the direct current rotating machine switch.

13. The rotating machine control device according to claim 1, wherein:
when stopping the one or more direct-current rotating machines, the control unit stops energizing the one or more direct-current rotating machines by operating the direct current rotating machine switch after reducing a current flowing in the one or more direct-current rotating machines by operating the plurality of inverter switching elements.

14. The rotating machine control device according to claim 1, wherein:
the one or more multi-phase rotating machines is a rotating machine for outputting a steering assist torque in an electric power steering system or a rotating machine for outputting a reaction torque or a turning torque in a steer-by-wire system.

15. The rotating machine control device according to claim 14, wherein:
the one or more direct-current rotating machines includes a steering-position actuator that controls a steering position to be variable.

16. The rotating machine control device according to claim 14, wherein:
the one or more direct-current rotating machines includes a steering lock actuator that regulates a rotation of a steering shaft.

* * * * *